United States Patent Office 3,520,838
Patented July 21, 1970

3,520,838
VINYLIC FILLERS AND THE REINFORCEMENT OF ELASTIC AND PLASTIC MATERIALS THEREWITH
Oliver W. Burke, Jr., 506 Intracoastal Drive, Fort Lauderdale, Fla. 33304
No Drawing. Continuation-in-part of applications Ser. No. 462,611, Oct. 15, 1954, Ser. No. 538,728, Oct. 6, 1955, and Ser. No. 795,881, Feb. 20, 1959, which are continuations-in-part of application Ser. No. 378,735, Sept. 8, 1953. This application Dec. 7, 1964, Ser. No. 416,585
Int. Cl. C08d 9/08
U.S. Cl. 260—4
17 Claims

ABSTRACT OF THE DISCLOSURE

Vinylic fillers are provided which are useful, inter alia, for reinforcing elastomers and plastomers, and which consist essentially of colloidal sized particles, e.g. 5 millimicron to 0.5 micron average diameter. These particles are obtained by interpolymerizing ethylenically unsaturated and non-conjugated diethylenically unsaturated monomers under conditions which cross-link the particles to insolubility and leave residual unsaturation in the polymer of the particles imparting to them an iodine number of at least 1. The filler particles may be formed at least in part from polar group containing monomers, and/or they may be modified in various ways, e.g. by reacting at least a part of the said residual unsaturation with non-metallic elements of Groups VI-A and VII-A of the Periodic Table, and/or by forming on the surfaces of the particles condensation products from the class of phenol-aldehyde and amino-aldehyde condensation products. Compositions reinforced by such vinylic fillers are also disclosed.

---

The present application is a continuation-in-part of my copending applications Ser. No. 462,611 filed Oct. 15, 1954 now Pat. No. 3,190,850, Ser. No. 538,728 filed Oct. 6, 1955, now abandoned, and Ser. No. 795,881 filed Feb. 20, 1959, now abandoned, which in turn were continuations-in-part of my application Ser. No. 378,735 filed Sept. 8, 1953, now abandoned.

This invention relates to the reinforcement of organic rubbers and plastic materials including natural rubber and synthetic elastomers and plastomers and aims generally to improve the same.

It further aims to provide new and useful organic fillers particularly but not exclusively useful for such purposes. Other uses of such new fillers are set forth in my copending applications Ser. No. 642,611 filed Oct. 15, 1954 and Ser. No. 538,728 filed Oct. 5, 1955.

In the field of natural rubbers and their modifications, the invention seeks severally and interdependently, (1) to provide methods and materials for reinforcing natural rubbers or their derivatives, (2) to obtain new products having desirable tensile strengths, (3) to in certain instances retain the low hysteresis properties of the natural rubbers in the reinforced material under flexure, (4) to enable retention of the natural rubber gum stock appearance and avoid the imparting of a predominant color thereto that would reduce the brilliancy or dull the clarity of color and pigments incorporated in the reinforced rubber, (5) to provide reinforcing for natural rubbers that effects the reinforcement thereof in thin sheets, fibres, and coatings and does not interfere with spreading or coating or dipping operations, (6) to provide reinforcing for natural rubber latices enabling the obtaining of reinforced products produced by latex processing, (7) to provide reinforcing in expanded or sponge rubber products produced from natural rubber or its latices, and more particularly reinforcers that do not interefere with the production of the production of the sponge rubber from the latices, (8) to provide reinforcing fillers that are effective in reinforcing natural rubbers for the manufacture of improved hard rubber articles, (9) to provide reinforcement in natural rubber products that does not interfere with bonding of the rubbers, (10) to provide reinforcement for natural rubber that enables elimination or control of conductivity and polarity affording improved electrical properties especially at high frequencies, (11) to provide reinforcement including special filler surfacing that enables control or even reversal of certain of the above enumerated properties, e.g., surfaced fillers for increasing internal friction or increasing polarity when such effects are desired, (12) to provide a chemically reactive, though completely insoluble, vinylic filler that can react with the natural rubber or with ingredients incorporated therewith, etc.

In the field of synthetic elastomers the invention seeks, severally and interdependently, (1) to provide reinforcement for butadiene-vinyl, e.g., butadiene-styrene polymers yielding products of high gum tensile strength not heretofore obtainable without discoloration and/or opacity, (2) to provide latex reinforcement of elastomer polymers effective for the production of reinforced products for the production of high tensile synthetic elastomer dipped and sponge goods and the like, (3) to provide reinforcements for synthetic elastomers that have various of the advantages enumerated for the natural rubber field and that impart to the synthetic elastomers tensile strengths and other physical advantages heretofore unobtained or substantially obtained only in natural rubber products, and particularly for those cases in which the use of carbon black is objectionably, (4) to produce reinforcement of synthetic elastomers and at the same time obtain improved hysteresis of such products under flexure, etc.

In the field of plastomers, the invention seeks, severally and interdependently, (1) the obtaining of reinforcement of plastomer products, especially when including plasticizers, without discoloration or interference with the coloring of such products, (2) the obtaining of such reinforcement with maintenance of transparency or controlled opacity, (3) the obtaining of such reinforcement while actually clarifying the transparency of the plastomer, (4) the obtaining of such reinforcement in the presence of colors, pigments and luminescent materials, (5) the provision of such reinforcement having surface characteristics capable of preventing bleeding of plasticizers from the plastomers, (6) to provide reinforcements for the plastomers that have various of the advantages enumerated for the natural rubber and synthetic elastomer fields where such advantages are appreciable or obtainable in the field of plastomers, etc.

As is set forth in application Ser. No. 462,611, now Pat. No. 3,190,850, issued June 22, 1965, the attachment of color components to vinylic fillers converts them to vinylic pigments having special utilities therein disclosed. The "vinylic pigments" are claimed in said Pat. No. 3,190,850, and are not claimed herein. It is therefore to be understood that the term "vinylic filler" as used herein connotes vinylic filler as distinguished from vinylic pigment, i.e. vinylic fillers essentially free of attached color components.

Further, in the respective fields, the invention seeks to provide not only new reinforcing organic fillers prepared with particular characteristics as regards to sizes and nature, but also new compounding methods, new latex blends, new dry reinforced products, new vulcanized reinforced products from vulcanizable rubbers and elastomers, new masterbatches in the fields in which masterbatching latex is practiced, and new species of organic fillers especially useful in combination with polar materials or especially useful in combination with non-polar materials.

Other objects and advantages of the invention, generally, and in its several applications, will become apparent from the following description of illustrative embodiments thereof. The invention resides in the new vinylic filler materials and modifications thereof and new combinations including the same, herein described and is more particularly pointed out in the appended claims.

The objects of the invention are in general achieved by incorporating in the material to be reinforced colloidal sized vinylic filler particles as more particularly described hereinafter.

PRELIMINARY DEFINITIONS

The term "vinylic fillers" herein designates the homo-polymerization and the multi-polymerization products, in the form of colloidal sized particles as hereinafter set forth, obtainable from polymerizable substances containing and polymerizable through one or more unsaturated linkages, more specifically the vinyl-, allyl-, polyvinyl-, poiyallyl-, vinylallyl-monomers, or other polymerizable unsaturated compounds, *providing* the products therefrom are cross-linked within the particles so that they are non-soluble in solvents for non-cross-linked polymer material, and have the rigidity characteristics requisite for filler utility. Such vinylic fillers may be chemically treated to introduce reactive or polar groups.

The insolubility of the filler can be verified by using a modified Ostwald pipette to determine the viscosity of a mixture of a small amount of the vinylic filler latex concentrate suspended in a mutual solvent for the water and similar but non-cross linked soluble vinyl polymer. A suitable mutual solvent is dioxane, which liquid will permit a colloidal dispersion of the vinylic filler particles, and in certain cases the dioxane can be augmented by an addition of a further polymer solvent such as methylisopropyl ketone. If the vinylic fillers are insoluble such vinylic particles have little effect on the viscosity of the liquid medium providing the concentration of such particles is low. If any substantial quantity of soluble polymeric material is present, however, the viscosity of the resulting solution is materially increased.

By "colloidal sized particles" as used herein, is meant particles in the colloidal size range of about 5 millimicrons to about 0.5 micron average diameter, which sizes are readily measured by the electron microscope.

To attain rigidity characteristics requisite for a reinforcing filler material, the cross-linked filler particles must be derived from appropriate precursor materials as is hereinafter more fully set forth.

By "cross-linked" is meant a three dimensional polymer network which is held together indissolubly by primary valence linkages and which therefore is non-soluble in solvents. Cross-linking in the formation of the filler of this present invention is accomplished by having one of the components of polymerization (which may even be the sole component) a cross-linking agent; such as a polyvinyl compound, a polyallyl compound or a vinylallyl compound, or other compounds with a plurality of functional groups capable of appropriately cross-linking the vinyl type monomers or plymers under the polymerization conditions employed. R. S. Morrell's book entitled "Synthetic Resins and Allied Plastics" published in 1951 by Oxford University Press, at page 212, shows that amounts even as low as 0.02 percent of divinylbenzene copolymerized with styrene under cross-linking conditions produces bulk products which are no longer soluble in organic solvent.

Further discussion of the term cross-linking, is found in Alfrey, Bohrer and Mark's book entitled "Copolymerization" published in 1951 by Interscience Publishers, Inc., New York, N.Y., Chapter IX, "Copolymerization Involving Divinyl Monomers" where the vinyl-allyl and di-allyl cross-linking agents are classified as di-vinyls.

"Cross-linking" as used herein can be brought about by polymerizing a cross-linking agent containing vinyl, allyl or vinyl-allyl groups; with or without other polymerizable or prepolymerized monomers that may constitute a large proportion of the cross-linked filler material, bearing in mind that non-soluble particles of colloidal sizes must be obtained.

The important characteristics of the cross-linking materials is that they include a plurality of polymerizable carbon-to-carbon unsaturated groups used for cross-linking. Representative monomeric cross-linking agents are, for the vinyl group, divinylbenzene and N,N-methylenebisacetylamide; for the allyl group, triallylcyanurate and N-N-diallylmelamine; for the vinylallyl group, allylacrylate; for the allyl-vinylidene group, allylmethacrylate.

To obtain the reinforcing effect with the vinylic fillers it is essential that the filler particles be cross-linked so as to be non-soluble as aforesaid, and that the filler particles distributed in the reinforced material be of *colloidal* size. When the particles are cross-linked to be non-soluble, they are also non-thermoplastic. These essential characteristics distinguish the materials of the present invention and provide a reinforcing effect that is entirely different from the so-called reinforcement heretofore obtained by adding to natural and synthetic rubbers an organic resin-type material *soluble* or *swellable* therein sometimes referred to as a "reinforcing plasticizer." In the latter case, the so-called reinforcement merely follows the laws of mixtures and is the proportionate average of the characteristics of the two mutually or partially soluble ingredients.

In the case of the present invention the vinylic filler particles do not dissolve or swell in the materials with which they are combined, and they thus do not become a part of the continuum but instead remain, as is discernible by the electron microscope, as small discrete particles that appear to be of spherical form, distributed in and throughout the materials being reinforced. The maximum quantity of reinforcing vinylic filler employed in a given quantity of rubbers, elastomers, and/or plastomers, must comprise not more than that portion of the entire volume of the reinforced product with which at least the free space around the tightly packed spheres is occupied by the continuum being reinforced by the vinylic fillers.

A colloidal suspension of vinylic filler in water is herein referred to as a latex. Such latices suitable for this invention can be formed with or without the aid of an emulsifying agent. Colloidal vinylic filler particles can be formed in water without emulsifiers if a suitable polymerization catalyst is used and in certain cases small amounts of a water-soluble monomer. Such emulsifier-free system must usually be polymerized in dilute water media. Therefore usually an emulsifier is preferred, especially where more concentrated latices are desired in the smaller range of colloidal sizes concerned.

The range of sizes found useful, i.e., about 5 millimicrons to about 0.5 micron average diameter, falls within the colloidal range, i.e., the range in which a latex of the particles, when properly prepared, is at least temporarily stable, viz., the particles are sufficiently small to be maintained in suspension by Brownian forces.

Specimens may be prepared by blending the vinylic latex with the latex of the representative materials to be reinforced, coagulating, drying, and milling, and such specimens show the dispersed condition of the insoluble colloidal sized particles in the coagulum, which condition remains unchanged, whether the products are vulcanized or not, as shown by the electron microscope and evidenced by the reinforcing effects attained. The composition of typical fillers examined under the electron microscope is given in Table XXIII.

Non-polar elastic and plastic materials are reinforced by both polar and non-polar vinylic fillers, however, polar elastic and plastic materials are, I have found, usually better reinforced by polar vinylic fillers. Therefore, the vinylic fillers are herein classified as polar and non-polar. In case a vinylic filler is to be made from an expensive vinylic monomer and the quantity of such monomer is not critical then copolymerization and interpolymerization are desirable ways of economically preparing colloidal sized cross-linked vinylic fillers and such fillers are therefore further classified herein as follows:

TABLE A (I) Homopolymeric vinylic fillers
    (a) Non-polar fillers
    (b) Polar fillers
(II) Copolymeric vinylic fillers
    (a) Non-polar fillers
    (b) Polar fillers
(III) Interpolymeric vinylic fillers
    (a) Non-polar fillers
    (b) Polar fillers

REINFORCEMENT BY EACH FILLER CLASS

Table I illustrates the use of the various classes of vinylic fillers

Employing a typical butadiene-styrene elastomer designated by the Government as GR-S one obtains excellent reinforcement using the different classes of vinylic fillers given above, when such insoluble vinylic fillers in latex form are blended with the GR-S latex and coagulated using salt and acid followed by drying, compounding and testing. The test results of the reinforcement of GR-S by representative vinylic fillers of the various classification groups is given in Table I. In this table GR-S 100 is, of course, the earlier designation given to the general purpose butadiene-styrene copolymer more recently designated as GR-S 1500, and interpolymers formed by two-stage polymerizations are used as the illustrative example of the Type III reinforcing fillers of Table A above, although this classification contemplates interpolymers formed in either two or more steps. GR-S 1500 has been made the subject of this table because this invention in this field represents the dual achievement of high gum tensiles with the type of material without accompanying discoloration or opacification.

The vinylic fillers according to this invention only reinforce elastic and plastic materials when they are dispersed therein as particles of colloidal size and in a manner so that the vinylic filler particles aggregation is not excessive.

Table II illustrates the importance of adequate dispersion of the filler with the continuum When the vinylic filler latices, per se, are salt acid coagulated and oven dried at 80° C. in the normal manner and then milled into elastic and plastic materials, reinforcement either does not occur or occurs only to a very limited degree. Apparently when so added the vinylic filler particles do not properly disperse in the elastic or plastic material continuum, and the present research has shown that such dispersion is effectively and simply produced by latex blending, which of course also permits of latex compounding. In addition my research has shown that by otherwise keeping the filler particles separated, it becomes possible to disperse them in the continuum to be reinforced. Thus, if the vinylic filler, either before or after coagulation in the aqueous phase, is but partially dried, or kept as a wet filter cake, the film of water adsorbed on the particles keeps them separated sufficiently to enable them to be mechanically dispersed in the wet or dry continuum, as by milling. Similarly, if the water in the partially dried vinylic filler, or in the wet filter cake thereof, is displayed by a hydrophilic or hydrophobic volatile or non-volatile material, preferably liquid, the film of the displacing material can likewise keep the particles separated so that they can be mechanically dispersed. Thus alcohol, acetone or dioxane may be used to displace the water from the damp vinylic filler particles, and these separating liquids can be volatilized while the particles are being milled into non-volatile materials such as rubber and plastics. Similarly, the vinylic fillers can be "flushed" from the aqueous dispersion or damp state, in the manner usual in the production of "flush colors" in

TABLE I.—VINYLIC FILLER TYPE REINFORCING GR-S

| Compound No. I | Control | Control | -1 | -2 | -3 | -4 | -5 | -6 |
|---|---|---|---|---|---|---|---|---|
| Elastomer latex (Dry basis): | | | | | | | | |
|   GR-S 100 | 100 | | | | | 100 | 100 | |
|   GR-S 1500 | | 100 | 100 | 100 | | | 100 | 100 |
| Vinylic filler latex (Dry basis): | | | | | | | | |
|   Quantity | | | 20 | 20 | 20 | 20 | 20 | 20 |
|   Type (Table A) | | | Ia | Ib | IIa | IIb | IIIa | IIIb |
| Composition: | | | | | | | | |
|   Styrene | | | | | | 49 | 90 | 80 |
|   Methylacrylic acid | | | | | | | | 10 |
|   Vinyl toluene | | | | | 98 | | 5 | |
|   o-Chlorostyrene | | | | | | 49 | | |
|   Divinylbenzene [1] | | | 100 | | 2 | 2 | 15 | 10 |
|   Ethyleneglycoldimethacrylate | | | | 100 | | | | |
| Polymerization recipe (Table III) | M | [2] M | K | H | [2] B | [2] B | [3] | [4] |
| Compound: | | | | | | | | |
|   Recipe Table XII | K | J | E | K | J | J | K | K |
|   Compound Mooney viscosity, ML-4 | 37 | 46 | 41 | 60 | 95 | 79 | 50 | 46 |
|   Cure, min. at 285° F | 90 | 75 | 60 | 60 | 90 | 90 | 60 | 90 |
| Test results: | | | | | | | | |
|   Elongation, percent | 320 | 370 | 650 | 750 | 315 | 360 | 620 | 660 |
|   Modulus, 300% | 160 | 495 | 380 | 310 | 1,910 | 1,590 | 475 | 540 |
|   Hardness, Shore A Durometer | 39 | 47 | 57 | 61 | 88 | 77 | 66 | 70 |
|   Tensile strength, p.s.i. | 215 | 600 | 2,030 | 1,950 | 1,980 | 2,000 | 2,650 | 2,885 |
|   Percent increase in tensile strength | | | 844 | 806 | 230 | 233 | 1,133 | 1,242 |

[1] Cross-linking agent.
[2] Calcium chloride coagulated.
[3] Stage I: 90 pts. styrene and 10 pts. divinylbenzene polymerized by Recipe A (Table III) as latex. Further polymerized in Stage II after adding 5 pts. vinyl toluene; 5 pts. divinylbenzene and 1.2 pts. diisopropylbenzene hydroperoxide.
[4] Stage I: 70 pts. styrene; 9 pts. divinylbenzene and 10 pts. methacrylic acid polymerized by Recipe A (Table III) as latex. Further polymerized in Stage II after adding 10 pts. isoprene; 1 pt. divinylbenzene and 1 pt. diisopropylbenzene hydroperoxide.

Table I not only shows the utility of the several classes of fillers above, but also exemplifies the advantages of incorporating polar groups (I-4) especially with an active hydrogen (I-6) to reinforce GR-S, and further shows a non-polar graft polymeric vinylic filler (I-5) reinforcing better than a similar non-polar copolymeric vinylic filler (I-3), and a specially grafted polar polymeric vinylic filler (I-6) reinforcing better than a polar copolymeric vinylic filler (I-4).

All examples in Table I were prepared by blending with GR-S latex, a latex of the insoluble vinylic filler, and coagulating and drying.

the pigment field with a non-volatile liquid, e.g. plasticisers, lubricating oil, etc., which serves to maintain the particles separated and dispersed therein for further use. Likewise, the vinylic filler in latex or still moist form can be combined with a hydrophilic carrier such as cellulose flock, and the combination may then be dried, whereupon the vinylic filler particles will be deposited on, and thus be kept separated by, the carrier. However, when the dried combination is milled into an elastomer or plastomer, the vinylic filler leaves the carrier and becomes dispersed in the continuum. Furthermore, the vinylic filler in latex or moist form may be dispersed or masterbatched in relatively heavy loading with a hydrophobic carrier, as explained hereinafter in connection with Table XV, and said carrier will maintain the particles separated for incorporation in elastomeric or plastomeric materials. The particle separating materials employed as above are preferably employed in amounts of from about 10% to 30% or more by volume based on the volume of the vinylic filler and the uniformity of size thereof, so as to substantially fill the spaces between the vinylic filler spheres, and keep the spheres apart. The minimum permissable quantity of any given separating material may be readily determined by the simple test of various proportions. Where combinations of separating materials with heavy or light loadings of water-wet vinylic filler are prepared as above, and especially when such combinations when oven dried yield a hard mass, then if the water-wet combinations are frozen, thawed, and then dried, a light, fluffy product is obtained, and the presence of the separating material in the dried product maintains the dispersibility of the vinylic filler.

The aforesaid need for dispersibility is illustrated in Table II comparing GR–S vinylic filler blends prepared by latex masterbatching of vinylic fillers with GR–S, and GR–S-vinylic filler blends prepared by milling the oven dried vinylic filler coagulum per se into GR–S solid rubber.

tomers, (III) plastomers by incorporating one or more vinylic fillers therein of the proper size and nature to produce such increase in tensile strength.

By "polar vinylic filler" is meant a vinylic filler having a polar group therein, such groups containing atoms other than carbon and hydrogen, such as oxygen, nitrogen, chlorine, etc. In contrast, "non-polar vinylic filler" designates these vinylic fillers which are hydrocarbon in nature, that is compounds of hydrogen and carbon only. In this definition I am not taking into account traces of polar catalyst residues or emulsifiers which may be present with the essentially non-polar materials. Non-polar vinylic fillers especially in the smaller ranges of colloidal sizes are usually emulsion polymerized from the non-polar monomers, that is hydrocarbon monomers.

PREPARATION OF COLLOIDAL SIZED INSOLUBLE VINYLIC FILLERS

It is well known to those skilled in the art that when a water soluble polymerization catalyst or catalyst system is used for polymerizing carbon-to-carbon unsaturated monomers as for the production of elastomers, then under the usual conditions of temperature, recipe balance, etc., little if any crosslinking occurs even in the presence of some non-conjugated diens monomer. Such result is desirable for producing elastomers and non-cross linked

TABLE II.—VINYLIC FILLERS PER SE BLENDED WITH GR-S VIA LATEX AND DRY

| Compound No. II | Control | -1 | Control | -2 | Control | -3 |
|---|---|---|---|---|---|---|
| Elastomer Latex (Dry Basis): | | | | | | |
| GR-S 100 (Recipe M-Table III [1]) | 100 | | | | | |
| GR-S 1500 (Recipe M-Lable III) | | 100 | 100 | 100 | 100 | 100 |
| Vinylic filler latex (dry basis): | | | | | | |
| Quantity | 20 | 20 | 20 | 20 | 20 | [2] 20 |
| Composition: | | | | | | |
| Styrene | 78 | 78 | 96 | 96 | 80 | 80 |
| Vinylpyridine | 10 | 10 | | | | |
| Methylmethacrylate | 10 | 10 | | | | |
| Butadiene | | | 2 | 2 | | |
| Methacrylic acid | | | | | 10 | 10 |
| Divinylbenzene [3] | 2 | 2 | 2 | 2 | 10 | 10 |
| Polymerization recipe (Table III) | B | B | B | B | A | A |
| Elastomer and vinylic filler blended | Dry | Latex | Dry | Latex | Dry | Latex |
| Compound: | | | | | | |
| Recipe (Table XII) | F | F | E | E | E | E |
| α-Isopropylaminopropionitrile | | | | | 3 | 3 |
| Compound Mooney viscosity, ML-4 | 42 | 75 | 43 | 52 | 42 | 48 |
| Cure, min. at 285° F | 105 | 45 | 90 | 90 | 60 | 45 |
| Test Results: | | | | | | |
| Elongation, percent | 360 | 835 | 450 | 885 | 700 | 785 |
| Modulus, 300% | 280 | 325 | 360 | 210 | 220 | 410 |
| Hardness, Shore A Durometer | 45 | 50 | 58 | 51 | 53 | 56 |
| Tensile strength, p.s.i | 330 | 2,125 | 520 | 1,400 | 540 | 3,250 |
| Percent increase in tensile strength | | 544 | | 176 | | 502 |

[1] Prepared with Santomerse S-3 emulsifier.
[2] Iodine number 6.1 as determined by Wijs method modified with mercuric acetate as described in Anal. Chem., 20, 679 (1948) with the sample size being increased to 1 gram (dry basis) and the 10 ml. of chloroform being substituted by 60 ml. of carbon tetrachloride and 10 ml. of acetic acid.
[3] Cross-linking agent.

SUB-GROUPS IN THE CLASSIFICATION OF VINYLIC FILLERS AND FURTHER DEFINITIONS

The cross-linked vinylic fillers have already been classified in Table A. In each class are polar as well as non-polar subclasses. The non-polar subclasses may contain some residual unsaturation, i.e., ethylene groups. The polar subclasses may contain residual unsaturation and/or special groups that impart particular characteristics to the fillers or render them especially suitable for reinforcing particular ones of the classes of reinforced materials. The following special groups, discussed hereinafter in connection with the examples, are especially contemplated: (1) carboxyl, (2) hydroxyl, (3) halogen, (4) amino, (5) nitrile, (6) acid amide, (7) aldehyde, (8) carbonyl.

Vinylic fillers having residual ethylenic unsaturation are important when either of the polar or of the non-polar type. Residual ethylenic groups in the vinylic filler permit chemical reaction such as chlorine or bromine addition thus yielding new polar vinylic fillers.

The following terms used to described the materials of this invention are herewith defined:

By the term "vinylic filler reinforcement" is meant the effect of increasing the tensile strength of an elastic or plastic material of the classes (I) rubbers, (II) elasplastomers. However, for producing the vinylic fillers of this invention, as indicated in Table III, crosslinking is required, and for this reason it is preferred to employ an oil-soluble catalyst such as an organic peroxide or hydroperoxide, the polymerization conditions and balance between the recipe components being adjusted to produce adequate crosslinking to render the particles non-soluble as defined above.

Furthermore, as will be evident from the foregoing to one skilled in the art, some of the monomers which may be employed in the preparation of vinylic fillers are less active than others and may require more radical conditions, such as higher temperatures, to produce polymerization and cross-linking thereof.

The vinylic fillers in the examples herein set forth were prepared according to one or more of the representative polymerization receipts given in Table III; however, such recipes are but illustrative of certain ways in which the invention has been practiced and are not to be construed as limiting the invention, since other cross-linking polymerization recipes may be employed and the invention is not limited to any particular recipe or recipes.

TABLE III.—REPRESENTATIVE VINYLIC FILLER LATEX AND GR-S CONTROLS POLYMERIZATION RECIPES

| Recipe III | A | B | C | D | E | F | G | H | I | K | L | M |
|---|---|---|---|---|---|---|---|---|---|---|---|---|
| Monomers | 100 | 100 | 100 | 100 | 100 | 100 | 100 | 100 | 100 | 100 | [1] 100 | [2] 100 |
| Water | 300 | 250 | 150 | 300 | 500 | 300 | 800 | 840 | 10,000 | 700 | 180 | 200 |
| Methylene chloride | | | | | 100 | | | | | | | |
| Emulsifiers: | | | | | | | | | | | | |
| Santomerse-3 [3] | 10 | 3 | | | | | | 20 | | 20 | 1.5 | |
| Dresinate 731 [4] | | | | 10 | | | | | | | | 5 |
| Duponol ME [5] | | | | | 10 | 10 | | | | | | |
| Potassium oleate | | | 3 | | | | | | | | | |
| Catalyst systems and modifiers: | | | | | | | | | | | | |
| Diisopropylbenzene hydroperoxide | 1.0 | 0.6 | 0.6 | 0.6 | | | | 4.0 | | | 0.1 | |
| Azobis-(isobutyronitrile) | | | | | | 1.5 | | | | 4 | | |
| Cumene hydroperoxide | | | | | | | | | | | | 0.1 |
| Potassium pyrophosphate | 0.21 | 0.07 | 0.21 | 0.07 | | | | 0.87 | | | 0.33 | 0.2 |
| Potassium persulfate [6] | | | | | 0.3 | | 6.0 | | 6.0 | | | |
| Sodium triphosphate | | | | | | | | | | | | 0.3 |
| Ferrous sulfate | 0.19 | 0.05 | 0.19 | 0.05 | | | | 0.76 | | | 0.28 | 0.18 |
| MTM [7] | | | 0.2 | | | | | | | | | |
| Tertiary dodecylmercaptan | 0.075 | 0.075 | | 0.075 | 0.1 | | | 0.2 | | | 0.35 | 0.18 |
| Tetraethylene pentamine | | 0.14 | | 0.14 | | | | | | | | |
| Potassium chloride | 0.5 | 0.5 | 1.0 | 0.5 | 0.5 | | | | | | | |
| Sodium bisulfite | | | | | 0.12 | | 2.4 | | 2.4 | | | |
| Polymerization temperature, °C | 50 | 40 | 40 | 50 | 50 | 60 | 60 | 50 | 60 | 60 | 5 | 5 |
| Polymerization time, hrs | 12-24 | 12-24 | 12-24 | 12-24 | 12-24 | 12-24 | 12-24 | 12-24 | 12-24 | 12-24 | 12-15 | 12-15 |
| Polymerization conversion, percent | 100 | 100 | 100 | 100 | 100 | 100 | 100 | 100 | 100 | 100 | 60 | 60 |

[1] The monomer is butadiene, the Mooney viscosity of the polymer produced was 30 ML-4.
[2] The monomer is a mixture of 75 pts. butadiene and 25 pts. styrene, the Mooney viscosity of the product was 50 ML-4.
[3] Santomerse S-3 is an alkyl-aryl sodium sulfate produced by Monsanto Chemical Co.
[4] Dresinate 731 is the sodium salt of disproportionated rosin produced by Hercules Powder Co.
[5] Duponol ME is the sodium salt of dodecyl alcohol sulfate produced by E. I. duPont de Nemours and Co., Inc.
[6] Subsequent addition of organic free radical catalyst may be employed if it is not convenient to adjust the conditions of polymerization and the balance between the recipe components to produce adequate cross-linking.
[7] MTM is a mixed tertiary dodecyl, tetradecyl and hexadecyl mercaptan produced by Phillips Petroleum Co.

MONOMERS USABLE IN VINYLIC FILLERS

The monomers that may be used in forming the vinylic fillers are the vinyls, the allyls and other monomers capable of emulsion polymerization between sub-freezing temperatures and elevated temperatures, e.g., from −20° C. to 130° C. or that upper temperature at which emulsions are no longer stable. The cross-linking can be accomplished by compounds containing a plurality of one or more of the following types of polymerizable unsaturated chemical bonds; vinyl, vinylidene, allyl, and other polymerizable ethylene groups and acetylene groups.

Where soft elastic grafts are desired on the vinylic fillers, then various dienes including alkyl and aryl substituted dienes can be used; however, at present only butadiene, the methyl-butadienes such as isoprene and chlorobutadiene are commercially available in quantity.

The following monomers are given as types of monomers which can be used to form vinylic fillers; however, many of the monomers cited are at present only laboratory curiosities. Nevertheless, in the future many will be commercially available from which vinylic fillers can be produced. The monomers given here are illustrative and not to be considered restrictive. Some of these monomers, such as alpha-methyl styrene, can only be emulsion polymerized in conjunction with another emulsion polymerizable monomer, but such monomers have been included for completeness. Many of those monomers which are commercially available have been used in the examples of this application and my U.S. application, Ser. No. 378,735 and Ser. No. 462,611 and are of such numbers and types as to demonstrate the utility of the groups of polymerizable monomers here recited. These monomers include: monovinyl aromatic compounds such as styrene, the methyl styrenes, the ethyl styrenes, the dimethyl styrenes, the diethyl styrenes, the isopropyl styrenes, the mixed alkyl styrenes; nuclear-substituted vinyl aryl compounds where the substitution is alkyl, aryl, alkaryl, aralkyl, cycloalkyl, alkoxy, aryloxy, chloro, fluoro, chloromethyl, fluoromethyl, and trifluoromethyl, including halogenated derivatives of these various aromatic vinyl compounds such as the mono- and dichlorostyrenes, and alkyl substituted mono- and dichloro styrenes; the vinyl naphthalenes, methyl vinyl naphthalene and their halogenated derivatives vinyl aryl acids and vinyl alkyl acids such as acrylic acid and the alpha- alkyl substituted acrylic acid such as methacrylic and esters of such acids as glycidyl, methyl, ethyl, propyl, butyl, isobutyl and esters from other aliphatic alcohols and N-substituted amino alcohol esters of such acids such as di- methylaminoethylmethacrylate and diethylaminoethacrylate, and mono esters of polyalcohols or substituted polyalcohols such as hydroxypropyl methacrylate, methoxyethylacrylate and butoxyethylacrylate; the amides of acrylic and methacrylic acids and derivatives thereof such as the methacrylamides, acrylamides, N-methyl acrylamides, N,N'-diethylacrylamide, N-ethylmethacrylamide, N,N'-dimethylmethacrylamide, etc.; the nitriles such as acrylonitrile, methacrylonitrile, ethylacrylonitrile, chloroacrylonitrile and other nitriles; the alkyl esters of alpha-methylene aliphatic monocarboxylic acids such as diethyl fumarate, diethylchloromaleate; the unsaturated ketones, methyl vinyl ketone, methyl isopropenyl ketone, benzalacetone, benzalacetophenone; the vinyl qinuolines, vinyl furans, vinyl carbazole and vinyl acetate; acrylamino substituted acrylic and methacrylic acids, and their esters, methyl, ethyl, propyl and the like such as α-acetaminoacrylate and the α-butyraminoacrylates, etc.; the ethers of olefinic alcohols, acids and esters especially the ethers of vinyl and allyl type alcohols such as vinyl ethyl ether, vinyl butyl ether, vinyl tolyl ether, divinyl ether, methyl isopropenyl ether, methallyl ethyl ether; the vinyl pyridines such as 2- or 4-vinyl pyridine, and substituted vinyl pyridines; unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl chloride, vinylidene chloride, 1-chloro-1 fluoroethylene and 4-chlorobutene-1; and the vinylidenes.

Polyvinyl, polyallyl and vinyl-allyl compounds which cause cross-linking are as follows: polyvinyl aromatic compounds such as divinylbenzene, divinyltoluene, divinylxylene, divinylethylbenzene, trivinylbenzene, divinylnaphthalene, divinylmethylnaphthalenes, halogenated divinylbenzene, triacrylylperhydrotriazine; the vinyl esters, allyl esters and vinyl allyl esters of carboxylic and polycarboxylic acids such as allyl methacrylate, allyl acrylate, cinnamyl methacrylate, ethylene glycol dimethacrylate, divinyl succinate, divinyladipate, vinylacrylate, vinylmethacrylate and polyalcohols or substituted polyalcohols of which a plurality of the hydroxyl groups thereof are esterified with polymerizable acids such as the esters of the glycols, glycerine, natural and synthetic sugars such as pentaerythritol, etc.; the aliphatic acetylenes such as vinylacetylene, alpha-methyl vinylacetylene, and the arylacetylenes such as phenylacetylene; dienic cross-linking agents, e.g., 2,5-bis(cinnamylidene)cyclohexanone. This list of monomers is illustrative but not to be considered restrictive.

The usual polymerization time for these recipes is 6–12 hours, and if after the 12-hour period the polymerization is not complete then additional polymerization catalyst is usually added and the temperature raised until the polymerization of reacting monomers is complete.

In certain cases where vinylic fillers are required with residual unsaturation to permit the particles to participate in the vulcanization of vulcanizable continua, divinyl monomers are employed such as divinylbenzene, or vinyl-allyl monomers such as allylmethacrylate, or a diene such as butadiene in moderate concentrations, and polymerization conditions are controlled to permit residual unsaturation in the vinylic filler and in such case the polymerization temperature usually is not raised and any residual unreacted monomer is usually vacuum stripped.

The technics of emulsion polymerization of vinyl monomers are adequately described in Examples A to K in Table III and in the patent literature and in such texts as Polymerisations-Kinetik by L. Kuchler, 1951, Springer Publishers, Heidelberg, Germany, and Mehrstoffpolymerisation by Franz Krczil, 1951, Leipzig, Germany, Styrene— Its Polymers, Copolymers and Derivatives by R. H. Boundy and R. F. Boyer, 1952, Reinhold Publishing Corporation. It is further understood that any of these techniques can be employed as long as they produce a latex of at least temporary stability.

The examples set forth herein are taken from an immense amount of experimental work and are selected to demonstrate how the vinylic fillers and certain specific types thereof can be used to reinforce the several classes of elastic and plastic materials referred to above and described in more detail hereinafter, in some instances with the aid of a reinforcement augmentor in the compounding recipe. While most of the vinylic fillers are products of emulsion homo- or copolymerization, there are two other very important types of vinylic fillers illustrated herein. These types: the emulsifier-free type and the graft-polymerization type of vinylic filler have certain advantages hereinafter set forth.

Certain of the difficulties encountered using the vinylic fillers produced by emulsion polymerization can be overcome if in place of using the conventional emulsifying agents one uses a polymeric emulsifying agent to produce the vinylic fillers. An alkaline solution of α-protein from soya beans when used as emulsifier produces a vinylic filler latex of small particle size.

Examples of polymeric emulsifying agents used in the preparation of a vinylic filler is given in Table XXVIII and discussed therewith.

The class of emulsifier-free vinylic fillers permits one to produce a colloidal dispersion in water of vinylic particles free of emulsifier. This is very important where the emulsifier may reduce tensile strength as in natural rubber or certain other elastomers or plastomers or where the emulsifier may reduce electrical resistivity as in polymers for electrical insulating purposes, or where the emulsifier may reduce surface tension as in the manufacture of foam sponges thereby not permitting the desired degree of foaming, or in other places where the presence of an emulsifier is undesirable as in the manufacture of plastomers of the alkyd resin or styrenated curing alkyl resin types for glass cloth and glass fiber bonding or other woven or mat fibers of organic or inorganic origin. The emulsifier-free vinylic filler latices are usually polymerized in dilute solutions and with sufficient catalyst to give colloidal sized particles, therefore such latices may contain excessive quantities of ash forming salts. Such salts can be removed from non-polar latices by passing the latices through ion exchange resins or by electrodialysis and either the polar or non-polar latices may be concentrated or increased in solids content by any suitable method of water removal such as vacuum latex concentration or spray concentration.

The other important type of filler is the interpolymer type of vinylic filler. This type comprises two categories: (1) graft-formed vinylic fillers in which an essentially non-cross-linked or soluble polymer is converted to an insoluble vinylic filler by graft polymerization (see Examples XXVII–1 and –2 and XXI–A–1 to –4), and (2) graft vinylic fillers in which a preformed insoluble cross-linked vinylic filler is grafted with further polymeric material, either cross-linked or non-cross-linked, to produce a modified filler particle (see Examples I–6, XXI–1 to –5, XXIV–1 to –4). Especially the second category is important because the cost of a vinylic filler can be reduced or other advantages can be obtained by first emulsion polymerizing one or more vinyl type monomers such as styrene with small amounts of a cross-linking agent such as divinylbenzene and then, in another polymerization step, coating or grafting to these insoluble vinylic particles a special or more expensive monomer selected to give particular properties which the basic particle does not possess. A few percent of a particular monomer can completely change the reinforcing properties of the base filler particles. These special monomers are often expensive and, if copolymerized, larger quantities are required to give the desired effect, however, when used only to surface-graft an already formed inexpensive base vinylic filler particle, only a very small quantity of the special monomer is required. Thus, 1 to 5 parts ethylene glycoldimethacrylate or allylacrylate will surface graft to 100 parts of styrene-divinyl benzene base filler particles; multi-grafting also can be provided. For instance, the base filler of non-polar character can be grafted or coated with a polar material like acrylonitrile and further grafted or coated with a material to give the correct surface configuration so that the elastic or plastic substance can align itself with the surface contour thus obtaining maximum reinforcing effect, without the necessity of actual chemical bonding of the filler to the continuum.

Where actual bonding of the reinforcing vinylic filler to the elastic or plastic material is desirable a chemically active graft can be provided as for example coating with acrolein, methacrolein or crotonaldehyde where the filler is to be used to reinforce the phenolic formaldehyde or other aldehyde condensation polymers. Surface graft with vinyl ethers or polyhydroxyl compounds, such as glycerol vinyl ether, or polymerizable acids such as acrylic or methacrylic acids, provide hydroxyl or carboxyl groups on the vinylic filler for attachment to other polyfunctional acids or alcohols or amines or isocyanates in the continuum through polycondensation reactions. Thus this invention provides a new raw material for the synthetic rubber-, plastic-, protective coating-, and adhesives-industries either as a vinylic filler particle not chemically bonded to the elastic or plastic medium or as a vinylic filler particle which is chemically bonded to these organic media.

CLASSES OF ELASTIC AND PLASTIC MATERIALS REINFORCIBLE WITH VINYLIC FILLERS AND DEFINITIONS

The several different classes of elastic and plastic materials that I have found may be reinforced by methods and means provided by my invention comprise natural rubbers and their derivatives and the synthetic rubber-like elastomers and the nonrubber-like plastomers as defined by H. L. Fisher (Ind. Eng. Chem., 31, 941). The discoveries forming the subject matter of this invention have been generally classified according to Fisher's classification of elastic and plastic materials. Fisher's study has shown that the elastic and plastic material within his broad definition are quite different and it is not possible to predict whether vinylic reinforcers effective for one class could operate effectively in another.

Thus the classes of materials reinforced by vinylic fillers of the present invention are:

(I) Natural rubbers and their modifications, including chemical, interpolymeric, and mixed polymeric modifications.

(II) Rubberlike (i.e., vulcanizable synthetic elastomers, comprising:

(A) Non-polar dienic elastomers [1]
    (1) Homopolymers
    (2) Multipolymers (B) Polar dienic elastomers [2]
    (1) Homopolymers
    (2) Multipolymers (C) Non-dienic elastomers (III) Non-rubberlike (i.e., non-vulcanizable elastomers and plastomers (i.e., Fisher's subdivisions of elastomers and plastomers exclusive of elastomers which are vulcanizable).

The classifications II and III of elastic and plastic materials just given are intended to include all of the types of materials classified by H. L. Fisher as synthetic rubber and rubberlike plastics in the reference hereinbefore cited. Fisher, in certain instances, utilizes the term "rubber-like" loosely in the sense of "elastic," whereas in the present specification the word is used in the more exact sense of vulcanizable as distinguished from non-vulcanizable materials.

For brevity herein the specific classifications of elastic and plastic materials reinforced by the vinylic fillers according to this invention are sometimes designated as follows:

Class I—Rubbers (natural and modifications)
Class II—Elastomers (synthetic, vulcanizable)
Class III—Plastomers (synthetic, non-vulcanizable).

And the several types in the elastomer class for brevity are sometimes identified herein by their acronyms, viz:

| Class | Acronym | Material |
|---|---|---|
| IIA-1 | VNDHE | Vulcanizable, non-polar dienic homopolymer elastomer. |
| IIA-2 | VNDME | Vulcanizable, non-polar dienic multi-polymer elastomer. |
| IIB-1 | VPDHE | Vulcanizable, polar dienic homopolymer elastomer. |
| IIB-2 | VPDME | Vulcanizable, polar dienic multipolymer elastomer. |
| IIC | VNE | Vulcanizable, non-dienic elastomer. |

By the term "dienic" is meant any elastic or plastic material formed at least in part from butadiene or a derivative of butadiene, that is, from a polymerizable material containing a plurality of polymerizable ethylene linkages of which at least two are conjugated.

By the term "homopolymer" is meant the polymerization product of a single polymerizable monomer. For example, butadiene is homo-polymerized to polybutadiene.

By the term "copolymer" is meant the polymerization product obtained when two or more polymerizable monomers are copolymerized, that is, simultaneously polymerized in the presence of each other. For example, butadiene and styrene are polymerized together to form a butadiene styrene copolymer.

By the term "interpolymer" is meant the polymerization product produced when two or more monomers are polymerized sequentially (called a "graft copolymer" in the Report on Nomenclature in Journal of Polymer Science, VIII, page 260, March 1952), or when one or more

[1] By non-polar dienic multipolymers is meant co-, inter-, and mixed polymers from organic monomers of which one or more is a conjugated diene together with at least one other organic material containing one or more polymerizable linkages of which no components are polar.

[2] By polar dienic multipolymers is meant co-, inter-, and mixed polymers from organic monomers of which one or more is a conjugated diene together with at least one other organic material containing one or more polymerizable ethylene linkages, at least one monomer component being polar.

materials are polymerized (e.g. homo-, co-, or condensation-polymerized) in the presence of a polymer. For example, natural rubber is swollen with methyl methacrylate and the latter polymerized and the resulting product is an interpolymer. When the components of an interpoly are inseparable from one another then the newly created polymer is referred to as a "graft polymer." (See T. Alfrey, Jr., J. Bohrer, and H. Mark's book entitled Copolymerization published in 1952 by Interscience Publishers, Inc., New York, especially Chapter VIII).

By the term "mixed polymers" is meant a physical mixture of two or more polymers. For example, if polybutadiene and the copolymer of butadiene-styrene are intimately mixed either by blending their latices, then coagulating and drying, or by mill-blending the dry polymers, the resultant blends are mixed polymers.

The numerous examples given above and hereinafter are presented in tabular form to enable one skilled in the art to compare the same to thus obtain a better understanding of the advantages and broad application of this basic invention in the several fields concerned.

Table IV includes examples of the reinforcement of Class I materials, the natural rubbers.

TABLE IV.—CLASS I—RUBBER REINFORCED WITH VINYL FILLERS

| Compound No. IV | Control | 1 | 2 | Comparison |
|---|---|---|---|---|
| Rubber: Natural rubber latex (Dry basis) | 100 | 100 | 100 | 100 |
| Vinylic filler latex (Dry basis): | | | | |
|   Quantity | | 20 | 20 | |
|   Composition: | | | | |
|     Styrene | | 98 | | |
|     Acrylonitrile | | | 95 | |
|     Allyl acrylate * | | | 5 | |
|     Divinylbenzene * | | 2 | | |
|   Filler polymerization recipe (Table II) | | D | E | |
| Comparative resin latex (Dry basis): | | | | |
|   Rubber-soluble styrene latex | | | | 20 |
|   Resin latex polymerization recipe (Table III) | | | | A |
| Compound: | | | | |
|   Recipe (Table XII) | A | A | A | A |
|   Compound Mooney vis., ML-4 | 31 | 32 | 68 | 53 |
|   Cure, minutes to 285° F | 60 | 45 | 45 | 30 |
| Test results: | | | | |
|   Elongation, percent | 820 | 770 | 795 | 715 |
|   Modulus, 300 percent | 200 | 380 | 500 | 410 |
|   Hardness, Shore A Durometer | 37 | 54 | 59 | 46 |
|   Tensile strength, p.s.i | 3,100 | 3,840 | 4,590 | 2,920 |
|   Percent increase in tensile strength | | 24 | 48 | −5.8 |

* Cross-linking agent.

Class I includes the natural rubbers and their derivatives and modifications including Haevea, Balata, chicle, and other naturally occurring rubbers and by natural rubber derivatives I mean not only the interpolymers of natural rubber and dienes, vinyls, and allyl monomers, but also the cehemical derivatives of these and of natural rubbers, such as the hydrogenated, hydroxylated, chlorinated, hydrochlorinated and the like, and the plasticized products thereof. The technics of preparing the various natural rubber derivatives is well reviewed in J. Le Bras, A. Delalande and J. Duclaux' book entitled Les Dérivés Chimiques du Caoutchouc Naturel, published in 1950 in Paris, France, by Dunod. These various natural rubber derivatives can be reinforced by vinylic fillers. Examples of modified rubbers are given in Table XIII showing interpolymers reinforced with vinylic fillers.

Examples IV-1 and IV-2 illustrate the application of reinforcing cross-linked vinylic fillers of both the non-polar Type II-a and the polar Type II-b to Heavea latex, a typical Class I rubber.

In these examples natural rubber latex and the vinylic filler latex were blended and coagulated by adding a salt-acid solution. The acid was about 0.5% $H_2SO_4$ solution and the sodium chloride solution concentration about 20%. The pH of the serum after coagulation was about 5. The resultant cocoagula was washed and dried, then compounded on a laboratory mill according to the compounding recipe given in the table, and finally was cured in a press. From the cured slabs tensile dumbells were cut and tested on a Scott tensile tester.

The natural rubber control sample had a tensile strength of 3100 p.s.i. (pounds per square inch) while the same rubber reinforced with the polar and nonpolar vinylic filler gave 3840 and 4590 p.s.i. respectively. Polystyrene resin was included in the comparative example, as such a resin and modifications thereof are commercially available, and such resins are noncross-linked and soluble in the natural rubber and therefore harden it somewhat but do not appreciably reinforce it and frequently weaken it as indicated in that example.

Table V presents examples of the reinforcement of Class IIA-1 elastomers.

TABLE V.—VNDHE-EXAMPLE—POLYBUTADIENE REINFORCED WITH VINYLIC FILLER

| Compound No. V | Control | 1 | 2 | Comparison |
|---|---|---|---|---|
| Elastomer latex (dry basis): Polybutadiene (Recipe L—Table III) | 100 | 100 | 100 | 100 |
| Vinylic filler latex (Dry basis): | | | | |
| Quantity | | 20 | ¹20 | |
| Composition: | | | | |
| Styrene | | 90 | | |
| Methyl methacrylate | | | 90 | |
| Ethylene glycoldimethacrylate ² | | | 10 | |
| Divinylbenzene ² | | 10 | | |
| Filler polymerization recipe (Table III) | | C | A | |
| Comparative resin latex (Dry basis): | | | | |
| Elastomer-soluble styrene resin | | | | 20 |
| Resin latex polymerization recipe (Table III) | | | | A |
| Compound: | | | | |
| Recipe (Table XII) | B | C | C | C |
| Compound Mooney vis., M L-4 | 19 | 67 | 65 | 57 |
| Cure, minutes at 285° F | 30 | 60 | 60 | 60 |
| Test results: | | | | |
| Elongation, percent | 465 | 400 | 300 | 250 |
| Modulus, 300% | 100 | 650 | 1,040 | |
| Hardness, Shore A Durometer | 21 | 62 | 60 | 62 |
| Tensile strength, p.s.i | 160 | 810 | 1,040 | 610 |
| Percent increase in tensile strength | | 406 | 550 | 281 |

¹ Iodine number 0.
² Cross-linking agent.

In this comparison example 20 parts polystyrene resin was incporated in 100 parts polybutadiene to form a mixed polymer. The observed resulting tensile strength, as in other comparison examples, is the weighted average of those of the two component polymers. The second control in Table XIII is closely similar as 23 parts of polystyrene were formed in situ in 77 parts polybutadiene that had been shortstopped, so that while the two polymer components were intimately mixed they were not chemically linked together. As shown by Example XIII-2 a mixture of polybutadiene and polystyrene is itself reinforced by vinylic fillers. See also Example XI-3 and compare examples in Table XV, herein shown to be analogous.

The data given in Table V and other tables is for the purpose of demonstrating the application of the invention only and thus polybutadiene with a polar vinylic filler gave a tensile strength increase of 550%. If one combines high and low Mooney polybutadiene together with situable compounding one can obtain tensiles using vinylic reinforcing fillers of over twice the values given in the tabulated examples. The particular butadiene polymer was selected for illustrative purposes only, and comparisons of the vinylic filler reinforced material with the control and with such material containing styrene resin soluble therein, as tabulated in Table V, demonstrate the reinforcing effect of the two general classes of vinylic fillers, and that both classes produce marked reinforcements, even in polybutadiene alone.

Table VI supplements Table I in illustrating the effectiveness of vinylic reinforcing fillers dispersed in GR-S (Class IIA-2) by latex masterbatching.

The general purpose synthetic rubbers manufactured in quantity are the butadiene-styrene copolymers known as GR-S. Both hot and cold types of GR-S, as well as oil extended GR-S and carbon black masterbatched GR-S with or without oil addition are all effectively reinforced by vinylic fillers. GR-S and other dienic polymers when reinforced by carbon black always show undesirably increased hysteresis; however, with vinylic fillers excellent reinforcement is obtained with much less increase in hysteresis. Thus the vinylic fillers are a very important discovery to reduce the tendency to build up heat of rubber products under flexure. Vinylic filler combinations with GR-S show excellent abrasion resistance. Carbon black GR-S rubber compositions are usually evaluated at a Shore A Durometer hardness value of 60 and to obtain such a value 50 pts. of black are mixed with 100 pts. of GR-S polymers and compounded. Vinylic reinforcing fillers will give the same Shore A Durometer hardness when 20 pts. of vinylic filler are dispersed in 100 pts. of GR-S. The tensile values with 20 pts. of vinylic filler are equal or better than those obtained with 50 pts. loading of carbon black. It should be noted that most of the other reinforcing fillers, i.e., known inorganic fillers, are not as effective as carbon black in the respects discussed. Therefore there is no point in comparing them with the vinylic fillers of this invention.

TABLE VI.—VNDME-EXAMPLE—BUTADIENE-STYRENE COPOLYMER REINFORCED WITH VINYLIC FILLERS

| Compound No. VI | Control | 1 | 2 | Comparison |
|---|---|---|---|---|
| Elastomer latex (Dry basis) GR-S 1500 (Recipe M—Table III) | 100 | 100 | 100 | 100 |
| Vinylic filler latex (Dry basis): | | | | |
| Quantity | | 20 | 20 | |
| Composition: | | | | |
| Styrene | | 90 | | |
| Methyl methacrylate | | | 90 | |
| Ethyleneglycoldimethacrylate* | | | 10 | |
| Divinylbenzene* | | 10 | | |
| Filler polymerization recipe (Table III) | | A | A | |
| Comparative resin latex (Dry basis): | | | | |
| Elastomer-soluble styrene resin | | | | 20 |
| Resin latex polymerization recipe (Table III) | | | | A |
| Compound: | | | | |
| Recipe (Table XII) | F | E | D | D |
| Compound Mooney vis, ML-4 | 37 | 57 | 53 | 75 |
| Cure, minutes at 285° F | 90 | 90 | 30 | 60 |
| Test results: | | | | |
| Elongation, percent | 320 | 620 | 740 | 750 |
| Modulus, 300% | 160 | 440 | 430 | 200 |
| Hardness, Shore A Durometer | 39 | 61 | 59 | 48 |
| Tensile strength, p.s.i | 215 | 2,301 | 3,000 | 930 |
| Percent increase in tensile strength | | 1,012 | 1,295 | 333 |

*Cross-linking agent.

As shown in this table, and in Table I, Examples I-5 and I-6, by using vinylic fillers in GR-S 1500 tensile strength increases of 1000% to 1295% were obtained over the gum stock control. Further, these GR-S 1500 stocks loaded with 20 pts. of vinylic filler based on 100 pts. of elastomer showed lower heat build ups on the Goodrich Flexometer than similar stocks reinforced with 35-50 pts. carbon black based on 100 pts. synthetic rubber. To the degree that carbon black is replaced in a tire tread or carcass stock by vinylic filler the operating temperature of the tires may be reduced. From this fact it, of course, becomes obvious that vinylic fillers can augment or partially or totally replace carbon and inorganic fillers in compounding recipes.

Class IIA-1 (VNDHE) elastomers exemplified in Table IV include the homopolymers of the dienes such as butadiene, isoprene, piperylene, 1,3-pentadiene, dimethyl butadiene, etc., and Class IIA-2 (BNDME) elastomers exemplified in Tables I and V include the co-, inter-, and mixed polymers of said non-polar dienes with or without vinyl compounds and other non-polar materials containing a polymerizable ethylenic group. Other important members of the Class IIA-2 elastomers are the polymers containing two or more ingredients from the group comprising the non-polar dienes and other non-polar polymerizable ingredients, of which at least one ingredient must be a diene for the polymer to be vulcanizable. Examples of such Class IIA-2 elastomers are:

(1) 2 or more dienes; e.g. butadiene-isoprene copolymer rubber.

(2) 1 or more dienes with one or more vinyls; e.g. butadiene-styrene copolymer rubber, ethylene-propylene-diene tripolymer rubbers in which the small amount of diene is usually non-conjugated such as cyclooctadiene, dicyclopenta-diene, and divinyl-benzene, and other rubbers prepared from alphaolefins and polyolefins and containing residual unsaturations.

(3) 1 or more dienes with one or more non-vinyl compounds containing a polymerizable ethylene linkage, e.g., the isoprene-isobutylene copolymer, after emulsification in water to form a latex.

(4) Any of 3 with one or more vinyls added. In the vinyls just mentioned there are, of course, included styrene, vinyl toluene and alpha-methyl styrene when copolymerized with an equimolar content of a polymerization-aiding vinyl monomer such as styrene or vinyl toluene. In the GR-S types of butadiene styrene copolymers in this class there is also one member including a small proportion of a cross-linking agent, that generally used being divinylbenzene, to reduce the polymer shrinkage while retaining its elastomer properties, and it is not intended to exclude such material, as the presence of the anti-shrinking agent in the elastomer being reinforced does not interfere with the reinforcement of the material by the vinylic fillers.

Table VI-A illustrates that the isobutylene copolymers of the butyl rubber type are reinforced by vinylic fillers.

The isoprene-isobutylene copolymers (butyl rubbers) while by classification members of the Class IIA-2 group elastomers, are not of the GR-S type because (1) they are not copolymers of a diene and a vinyl, but are copolymers of a diene and isobutylene, and (2) the diene isoprene is present in very low concentrations of the order of 5% as compared to the 72% butadiene content of GR-S 100.

Compound VI-A-2 was prepared as follows: 100 pts. of GR-I-18 was dissolved in 300 pts. methylene chloride with 10 pts. of disproportionated rosin acid (Dresinate Acid 731, Hercules Powder Co.) and 5 pts. of 28% aqueous ammonia and an emulsion formed. To this emulsion was added 20 pts. (dry basis) of vinylic filler latex and the resultant emulsion was mixed well, coagulated with dilute sulfuric acid and the methylene chloride solvent and water removed. The resultant GR-S vinylic filler blend was compounded, cured and tested and the test results are given in Table VI-A. The example in Table VI-A is illustrative only and is in no way intended to indicate the maximum reinforcing effect which can be achieved by properly incorporating an adequate vinylic filler into butyl rubber.

The use of vinylic fillers in butyl rubber should permit butyl articles of commerce such as tire tubes to be prepared with less low temperature stiffening than similar articles prepared with the usual carbon black loadings.

TABLE VI-A.—VNDME-EXAMPLES (CONTINUED)—ISOBUTYLENE-ISOPRENE COPOLYMERS REINFORCED WITH VINLYIC FILLERS

| Compound VI-A | Control | 1 | 2 |
|---|---|---|---|
| Elastomer (Dry basis): | | | |
| GR-S 18 (Butyl rubber) | 100 | 100 | 100 |
| Dresinate 731 | | 10 | 10 |
| Vinylic filler latex (Dry basis): | | | |
| Quantity | | | ¹ 20 |
| Composition: | | | |
| Styrene | | | 90 |
| Divinylbenzene ² | | | 10 |
| Filler polymerization recipe (Table III) | | | A |
| Compound: | | | |
| Recipe | (³) | (³) | (³) |
| Compound Mooney vis., ML-4 | 75 | 49 | |
| Cure, minutes at 285° F | 45 | 60 | 90 |
| Test results: | | | |
| Elongation, percent | 640 | 750 | 775 |
| Modulus, 300% | 155 | 160 | 190 |
| Hardness, Shore A Durometer | 40 | 38 | 49 |
| Tensile strength, p.s.i | 435 | 840 | 1,140 |
| Percent increase in tensile strength | | 93 | 162 |

¹ Iodine number 7.2.
² Cross-linking agent.
³ Compound Recipe (based on 100 pts. butyl rubber) 5 pts. zinc oxide, 1 pt. stearic acid, 0.5 pts. benzothiazylidisulfide, 1.0 pts. tetramethyl-thiuram disulfide, 2 pts. sulfur.

Table VII is representative of vinylic fillers reinforcing (VPDHE) elastomers of subclass IIB-1 consisting of polar homopolymers. Polychloroprene (neoprene) is the principle example of this class. As shown in this table, chlorine containing vinylic fillers are very effective as reinforcing agents for neoprene.

TABLE VII.—VPDHE-EXAMPLE—POLYCHLOROPRENE (NEOPRENE) REINFORCED WITH VINYLIC FILLERS

| Compound No. VII | Control | 1 | 2 |
|---|---|---|---|
| Elastomer latex (Dry basis): Polychloroprene ¹ | 100 | 100 | 100 |
| Vinylic filler latex (Dry basis): | | | |
| Quantity | | 20 | 20 |
| Composition: | | | |
| o-Chlorostyrene | | 98.5 | |
| Styrene | | | 99.2 |
| Divinylbenzene ² | | 1.5 | 0.8 |
| Filler polymerization recipe (Table III) | | B | B |
| Compound: | | | |
| Recipe (Table XII) | G | G | G |
| Compounding Mooney viscosity, ML-4 | 200+ | 200+ | 200+ |
| Cure, minutes at 285° F | 15 | 30 | 60 |
| Test results: | | | |
| Elongation, percent | 470 | 515 | 365 |
| Modulus, 300% | 545 | 1,325 | 1,530 |
| Hardness, Shore A Durometer | 52 | 73 | 70 |
| Tensile strength, p.s.i | 1,130 | 2,385 | 1,825 |
| Percent increase in tensile strength | | 111 | 62 |

¹ Neoprene #571 E. I. du Pont de Nemours and Company.
² Cross-linking agent.

Table VIII is representative of polar elastomers, specifically butadiene-acrylonitrile copolymers, reinforced with vinylic fillers of both the polar and non-polar types.

The butadiene-acrylonitrile copolymer is an example of subclass IIB-2. In this class of elastomers homologues of butadiene can be used in conjunction with or in place of the butadiene and in addition other polymerizable polar organic compounds can be used in place of or in addition to the acrylonitrile. Such other polar compounds include: vinylaldehydes and ketones, e.g., acrolein, methacrolein, vinyl methyl ketone, methyl isopropenyl ketone; vinyl acids, e.g., acrylic acid, methacrylic acid, cinnamic acid and their esters prepared from saturated and unsaturated alcohols, phenols, etc.; polar derivatives of non-polar vinyls such as the halogen derivatives of styrene and of vinyl toluenes; nitrogen containing vinyl compounds, such as methacrylonitrile, vinylpyridine and the vinyl substituted pyridines; and polymerizable halogen hydrocarbons, e.g., trichloroethylene, 1,1-difluoroethylene.

TABLE VIII.—VPDME-EXAMPLE—BUTADIENE-ACRYLONITRILE COPOLYMER REINFORCED WITH VINYLIC FILLERS

| Compound No. VIII | Control | 1 | 2 | 3 |
|---|---|---|---|---|
| Elastomer latex (Dry basis): | | | | |
| Butadiene-acrylonitrile copolymer ¹ | 100 | 100 | | |
| Do.² | | | 100 | 100 |
| Vinylic filler latex (Dry basis): | | | | |
| Quantity | | 20 | 20 | 20 |
| Composition: | | | | |
| Methyl methacrylate | | | 10 | |
| Vinylpyridine | | | 10 | |
| Styrene | | 90 | 78 | |
| o-Chlorostyrene | | | | 96 |
| Divinylbenzene ³ | | 10 | 2 | 4 |
| Filler polymerization recipe (Table III) | | A | B | B |
| Compound: | | | | |
| Recipe (Table XII) | E | E | H | E |
| Compound Mooney vis., ML-4 | 48 | 95 | 112 | 59 |
| Cure, minutes at 285° F | 60 | 45 | ⁴ 20 | 60 |
| Test results: | | | | |
| Elongation, percent | 320 | 300 | 250 | 450 |
| Modulus 300% | 380 | 1,825 | | 900 |
| Hardness, Shore A Durometer | 50 | 75 | 100 | 63 |
| Tensile strength, p.s.i | 435 | 1,825 | 2,975 | 1,700 |
| Percent increase in tensile strength | | 320 | 583 | 290 |

¹ B. F. Goodrich Co. Hycar 1513 (acrylonitrile 28%).
² B. F. Goodrich Co. Hycar 1514 (acrylonitrile 22%).
³ Cross-linking agent.
⁴ 310° F. curing temperature instead of 285° F.

Table IX has reference to the reinforcing of materials of class IIC. This class of elastomers comprises elastic and plastic materials not containing butadiene or a substituted butadiene yet vulcanizable by curing systems, even though without sulfur. The polyalkene sulfide, Thiokol, is an example of this class which also includes the ethylene-propylene rubber, and other rubbers prepared from alpha olefins, and the halocarbon rubbers especially the fluorocarbon rubbers, curable by peroxide or amine curing systems, the lactoprene polymers not including dienic components and utilizing an ester exchange or halogen replacement reaction for vulcanization purposes; the elastoplastics including mixed glyptals as defined by H. Fisher and which are vulcanizable; the polyesters including those containing residual unsaturation and curable by an organic perioxide curing system; and the polyesters which are vulcanized through terminal carboxyl or hydroxyl groups, for instance by reaction with a polyisocyanate forming the so-called isocyanate polyester elastomers of the Vulcollan type.

TABLE IX.—VNE-EXAMPLE—POLYALKENE SULFIDE (THIOKOL) REINFORCED WITH VINYLIC FILLER

| Compound No. IX | Control | 1 |
|---|---|---|
| Elastomer Latex (Dry basis): Polyalkene sulfide [1] | 100 | 100 |
| Vinylic filler latex (Dry basis): | | |
| Quantity | | 20 |
| Composition: | | |
| Acrylic acid | | 10 |
| Styrene | | 80 |
| Divinylbenzene [2] | | 10 |
| Filler polymerization recipe (Table III) | | A |
| Compound: | | |
| Recipe (Table XII) | L | L |
| Compound Mooney viscosity, ML-4 | 20 | 30 |
| Cure, minutes at 265° F | 120 | 120 |
| Test results: | | |
| Elongation, percent | 500 | 800 |
| Tensile strength, p.s.i | 95 | 340 |
| Percent increase in tensile strength | | 258 |

[1] Mixture of Thiokol ST 90 pts. and Thiokol LP-2 10 pts. supplied by Thiokol Corporation.
[2] Cross-linking agent.

Tables X and XI illustrate the application of this invention to the plastomers and non-vulcanizable elastomers of Class III. The term plastomers refers to H. Fisher's class of plastomers which include subclasses (a) the true Thermoplastics, and (b) the thermosetting plastics. The term non-vulcanizable elastomers includes H. Fisher's subclassification of elastolene and elastoplastics under his general classification of elastomers, excluding therefrom vulcanizable materials that are more properly included in the rubber-like (vulcanizable) elastomers class.

Polyvinyl chloride and polyvinylidene chloride and copolymers thereof with and without plasticizer, especially a copolymer of vinyl-chloride-vinylidene chloride, have become very important plastomers and are reinforced by vinylic fillers, as shown in Table X. No attempt will be made to discuss the numerous variations of vinyl chloride and vinylidene chloride polymers and copolymers, and the many different types of plasticizers which can be used other than to here state that such variations as shown by the research on which this specification is based, do not inhibit the vinylic filler reinforcing effect.

TABLE X.—PLASTOMER EXAMPLE—VINYLCHLORIDE-VINYLIDENE CHLORIDE COPOLYMER REINFORCED WITH VINYLIC FILLERS

| Compound No. X | Control | 1 | 2 |
|---|---|---|---|
| Plastomer latex (Dry basis): | | | |
| Vinylchloride-vinylidene chloride copolymer [1] | 80 | 80 | 80 |
| Dioctylphthalate (plasticizer) | 20 | 20 | 20 |
| Vinylic filler latex (Dry basis): | | | |
| Quantity | | 20 | [2] 20 |
| Composition: | | | |
| Styrene | | 90 | |
| Methylmethacrylate | | | 90 |
| Divinylbenzene [3] | | 10 | 10 |
| Filler polymerization recipe (Table III) | | A | A |
| Test results: | | | |
| Elongation, percent | 200 | 50 | 200 |
| Tensile strength, p.s.i | 1,200 | 2,030 | 2,040 |
| Percent increase in tensile strength | | 65 | 67 |

[1] Dow Chemical Company latex #744B is reported to be polyvinyl chloride-vinylidene chloride copolymer.
[2] Iodine number 2.5.
[3] Cross-linking agent.

In Table X tensile film strips were prepared by blending the vinylic filler latex with the vinyl chloride-vinylidene chloride latex, adding the dioctylphthalate plasticizer and mixing a short time with a high speed Waring laboratory mixer, then allowing such mixture to dry in a shallow tray at 60° C., then milling the product on a hot laboratory mill, cooling, and removing from the mill as a clear smooth continuous sheet and cutting therefrom dumbell-shaped tensile strips. The tensile strength was measured using a Scott Tensile Tester. As is clear from Table X the tensile strength of the plastomer was increased (over 60%) by the reinforcing vinylic filler. This is very significant as a styrene resin, not cross-linked, actually reduced the tensile strength of vinyl chloride-vinylidene chloride film by nearly 10%.

Important for this invention is the fact that vinylic reinforcing fillers will markedly improve the physical properties of not only the vinyl chloride resins, plastics, films, and fibers, but also those of the other plastomers.

An excellent review of the polyvinyl chloride type plastomers and a discussion of the similarities thereof, is found in the text Polyvinylchlorid and Vinylchlorid-Mischpolymerisate by Franz Kainer, published in 1951 by Springer-Verlag, Heidelberg, Germany, and the examples of Table X, in view of such similarities, indicate that all such polyvinyl chloride containing plastomers can be reinforced with vinylic fillers according to this invention.

In more detail, the Class III plastomers and non-vulcanizable elastomers include the following: polymers from monomers containing polymerizable ethylenic linkages, other than vinyl polymers, with or without other polymerizable constituents, e.g., sulfur dioxide or vinyl constituents, such as polyethylene, polypropylene, polyisobutylene, polysulfones (e.g., isobutylene-sulfur dioxide copolymers), isobutylene-styrene copolymers, and the like; polymers prepared from vinyl monomer or monomers, e.g., styrene, vinyl toluene and alpha methyl styrene; from halogenated vinyl compounds, e.g., chlorostyrene, vinyl chloride, vinyldene chloride, perfluoroethylene, trifluorochloroethylene, propylene, etc., from the vinyl acids and their esters, e.g., acrylic acid, methacrylic acid, ethyl acrylate, methyl methacrylate, etc.; from vinyl ethers, e.g., vinyl ethyl ether; from vinyl alcohols and their esters, e.g., vinyl alcohols, vinyl acetate, the acrylates and fluorinated acrylesters and vinyl butyrate; from vinyl ketones, e.g., methyl vinyl ketone, methyl isopropenylketone, etc.; and from nitrogen containing vinyl monomers, e.g., vinyl pyridine or acrylonitrile. Copolymers, mixed polymers and interpolymers of vinyl monomers are included in Class III together with any other organic compounds which can join thereto. If a diene is used in forming such plastomers and non-vulcanizable elastomers, the plastomer must be hydrogenated, halegnated, hydrohalogenated, hydroxylated or otherwise treated to remove the unsaturation, otherwise the unsaturated materials would be capable of vulcanization and therefore classified as elastomers. In the event these polymers, copolymers, interpolymers or mixed polymers have second order transition temperatures above the temperature of use then to obtain the full reinforcing effect of the vinylic filler described herein plasticizers must be added to lower the second order transition temperature below the temperature of use.

The Bakelite type materials of Class III and other thermosetting plastomers that retain some degree of elasticity at the temperature of use are likewise reinforced with vinylic fillers.

The cellulose derivatives of Class III are also reinforced by the vinylic reinforcing materials of this invention, for example, the cellulose ether derivatives such as methyl cellulose, ethyl cellulose, hydroxyethyl cellulose, carboxy methyl cellulose, etc.; and the cellulose ester derivatives, e.g., cellulose acetate and cellulose nitrate. The reinforcement of these cellulose derivatives is particularly effective when such are plasticized and the smaller colloidal sizes of vinyl filler materials are especially desirable therefor as they do not destroy the transparency of the product.

As noted, the plastomers of Class III and mixture thereof with Class II elastomers are all reinforced by the vinylic filler and the results are given in Table XI for a typical vinylic filler latex blended with four typical latices of polymers of Class III, namely, polyvinylacetate, polyvinylbutyral, styrene-acrylonitrile copolymer and ethyl cellulose; the product in each case being dried and tested in the manner outlined in connection with Table X above.

ever, such examples are in no sense to be construed as the maximum results obtainable using vinylic fillers to reinforce elastic and plastic materials. This is illustrated by the compounds of polychloroprene. Neoprene latex 571 was available and even though such a latex is an excellent film former it contains too much gel to give high tensile when compounded as solid rubber, however, such latex is perfectly suitable to show that substantial improvement

TABLE XI.—PLASTOMERS REINFORCED WITH VINYLIC FILLER

| Compound No. XI | Control | 1 | Control | 2 | Control | 3 | Control | 4 |
|---|---|---|---|---|---|---|---|---|
| Plastomer latex (Dry basis): | | | | | | | | |
| Polyvinylacetate [1] | 100 | 100 | | | | | | |
| Polyvinylbutyral [2] | | | 100 | 100 | | | | |
| Styrene-acrylonitrile [3] | | | | | 100 | 100 | | |
| Ethyl cellulose [4] | | | | | | | 100 | 100 |
| Vinylic filler latex (Dry basis) [5] | | 20 | | 20 | | 20 | | 20 |
| Test results: | | | | | | | | |
| Elongation, percent | 30 | 20 | 565 | 500 | 150 | 150 | 50 | 30 |
| Tensile strength, p.s.i | 1,220 | 1,655 | 585 | 1,520 | 1,335 | 2,250 | 1,650 | 1,900 |
| Percent increase in tensile strength | | 36 | | 160 | | 69 | | 15 |

[1] Monsanto Chemical Company's aqueous dispersion KR-2.
[2] Monsanto Chemical Company's aqueous dispersion Merlon BRS.
[3] Naugatuck Chemical Division of U.S. Rubber Co. Kralastic Latex #4109A. This is reported to be a styrene/acrylonitrile copolymer plasticized with 25–30 pts. butadiene-acrylonitrile copolymer according to U.S. Patent Nos. 2,439,202, 2,503,349, 2,550,139. This is an example of a mixture of Class II elastomers and Class III plastomers, and this example shows reinforcement of such mixture by a vinylic filler.
[4] Ethocel-castor oil, ratio 67 to 33; prepared with standard Ethocel (50 cps. vis.) produced by Dow Chemical Co.
[5] Vinylic filler latex preparation: 80 pts. styrene, 10 pts. divinylbenzene and 10 pts. methacrylic acid polymerized according to Table III, recipe A, with adjustment of latex pH to 8 using 28% ammonium hydroxide.

As plastomers of the types exemplified in Table XI are frequently used as transparent wrappings, fabric coatings and for other purposes in which coloring or opacifying of the film is undesirable, it is to be noted that the vinylic reinforcers of the invention, especially when of less than maximum colloidal particle size, make no appreciable change in the color or opacity of the continuum, and in certain cases even clarify the film.

in tensile strengths (on a qualitative basis) are obtained by using vinylic fillers with polychloroprene and thus the tensile values given in Table VII are by no means the maximum obtainable from the quantitative standpoint, but they do serve the purpose as suitable examples to show the principal involved. This same comment is especially applicable to Example VI–A–2 and the examples in Tables X and XI.

TABLE XII.—COMPOUNDING RECIPES FOR VULCANIZATION
[Pts. per 100 Pts. of Vulcanizable Material]

| Compound No. XII | A | B | C | D | E | F | G | H | I | J | K | L |
|---|---|---|---|---|---|---|---|---|---|---|---|---|
| Magnesium oxide (light calcined) | | | | | | | 4 | | | 20 | | |
| Zinc oxide | 5 | 3 | 3 | 3 | 3 | 3 | 5 | 3 | 5 | | 3 | 0.5 |
| Stearic acid | 1 | 1 | 3 | 1 | 2 | 1 | 0.5 | 1.5 | | | 2 | 3 |
| Benzothiazyldisulfide | 1 | | | | | 1 | 0.5 | 1.5 | 1 | 1 | | |
| 2-mercaptobenzothiazole | | 1 | | | | | 0.5 | | 0.5 | | 1 | |
| N-cyclohexyl-2-benzothiazolesulfenamide | | | 1 | 1 | 1 | | | | | | | |
| Tetramethylthiurammonosulfide | | | | | | | | | 0.15 | | | |
| Accelerator A-32* | | | 0.2 | 0.2 | 0.2 | | | | | | | |
| Tetraethyl thiuram disulfide | | | | | | | | | | 0.15 | 0.2 | |
| Sulfur | 2.5 | 2.5 | 2.5 | 2.5 | 2.5 | 2.5 | | 2.0 | 2.5 | 4 | 2.5 | |
| p-Quinonedioxime | | | | | | | | | | | | 1.5 |

*Reaction product of butyraldehyde and butylidene aniline made by the Monsanto Chemical Company.

Table XII sets forth the compounding recipes used in the examples given of the reinforcement of vulcanizable elastomers and rubbers and in the controls therefor.

These compounding recipes are typical of conventional recipes and the invention is not limited to any particular compounding recipe. Plastomers are also compounded sometimes with fillers and usually with plasticizers. It can be said that a great variety of compounding ingredients can be used in conjunction with the vinylic fillers and the rubbers, elastomers, plastomers, and combinations thereof which such fillers reinforce. Therefor the compounding recipes given in Table XII are representative only and are not to be construed as limiting the scope of this invention. Thus, other free radical generating cures, e.g., peroxide cures as with di-cumyl peroxide, radiation cures, etc., can be employed.

The examples given throughout this specification are typical and illlustrate the principles of the invention, how- Table XIII includes examples demonstrating that interpolymers of rubber elastomers and plastomers are also reinforced with vinylic fillers.

For this table interpolymers were prepared from natural rubber and the homopolymeric non-polar elastomer polybutadiene and further from the homopolymeric polar elastomer chloroprene. To the latices of natural rubber, polybutadiene and polychloroprene were added either the vinyl monomers methyl methacrylate or styrene together with a small amount of cumene hydroperoxide 0.5 pt. per 100 pts. of the latex treated and the mixture placed in bottles sealed and heated at 80° C. for 12 hours in an oven when the formation of the interpolymer was complete. These interpolymeric latices were then blended with vinylic filler according to Table XIII and the resultant latex blends coagulated with salt and acid then dried and compounded.

TABLE XIII.—REINFORCEMENT OF INTERPOLYMERS OF NATURAL RUBBER AND ELASTOMERS BY VINYLIC FILLERS

| Compound No. XIII | Control | 1 | Control | 2 | Control | 3 |
|---|---|---|---|---|---|---|
| Interpolymeric latices (Dry basis): | | | | | | |
| Rubber and elastomer composition of— | | | | | | |
| Natural rubber latex | 80 | 80 | | | | |
| Polybutadiene latex (Table III, Recipe L) | | | 77 | 77 | | |
| Polychloroprene (Neoprene latex #571) | | | | | 95 | 95 |
| Interpolymerizing monomer: | | | | | | |
| Methyl methacrylate | 20 | 20 | | | 5 | 5 |
| Styrene | | | 23 | 23 | | |
| Vinylic filler latex (Dry basis): | | | | | | |
| Quantity | | 20 | | 20 | | 20 |
| Composition: | | | | | | |
| Methyl methacrylate | | 80 | | 80 | | 80 |
| Methacrylic acid | | 10 | | 5 | | 5 |
| Butadiene | | | | 5 | | 5 |
| Ethylene glycoldimethacrylate * | | 10 | | 10 | | 10 |
| Filler polymerization recipe (Table III) | | A | | B | | B |
| Compound: | | | | | | |
| Recipe (Table XII) | A | A | E | E | G | G |
| Allyl amine | | 3 | | 2 | | |
| Compound Mooney viscosity, ML-4 | 28 | 29 | 118 | 200+ | 200+ | 200+ |
| Cure, Minutes at 285° F | 60 | 30 | 30 | 30 | 60 | 60 |
| Test results: | | | | | | |
| Elongation, percent | 600 | 650 | 280 | 440 | 400 | 340 |
| Modulus, 300 percent | 380 | 2,400 | 750 | 750 | 585 | 980 |
| Hardness, Shore A Durometer | 41 | 77 | 61 | 72 | 56 | 81 |
| Tensile strength, p.s.i | 1,840 | 3,340 | 790 | 1,150 | 850 | 1,325 |
| Percent increase in tensile strength | | 82 | | 46 | | 56 |

* Cross-linking agent.

Table XIV and XV illustrate the efficacy of vinylic fillers in reinforcing combinations of elastomers. Table XIV shows that GR-S 1500 blended with polybutadiene or with the copolymer of butadiene and acrylonitrile are reinforced with vinylic fillers. Polybutadiene has excellent low temperature flexibility and when this property is desired it is often blended with copolymers of butadiene and styrene. The blends were prepared for Table XIV by blending the elastic latices with and without the vinylic filler latex, salt-acid coagulating and drying and resultant mixed polymers were compounded and tested. Natural rubber latex may similarly be blended with GR-S type copolymer latices to yield combinations suitable for the manufacture of sponge rubber and such latices can be reinforced with vinylic filler latices especially when such latices are prepared without emulsifier as set forth in connection with Table XXI hereinafter. However, by using the vinylic filler a sufficiently high tensile strength may be imparted to the GR-S type materials to render them suitable for sponge rubber manufacture with material reduction or elimination of natural rubber or other similar addituents.

The percent increase in tensile strength of 774% and 598% represents the increase over the average of the tensile strengths of the individual components, achieved by reinforcement with vinylic fillers.

Other examples of mixed elastomers are given in Table XV. A mixture of butadiene-styrene copolymers has been selected, one component of this mixture having a butadiene content of 75% or more (GR-S 100) and the other component of this mixture having a butadiene content of 20% or less and Table XV demonstrates the vinylic filler reinforcement of such a mixture of two butadiene-styrene copolymers of high and low butadiene contents, respectively. The copolymer with low butadiene content is referred to in the trade as a vinyl resin, and is soluble in and hence capable of blending with the GR-S 100 (now termed GR-S 1500). Blends of elastomers of high and low butadiene content, such as those herein considered are extensively used in the rubber shoe sole and heel industry, the low butadiene component being added to increase the stiffness and abrasive properties.

In the examples of Table XV the vinyl resin elastomers were prepared by emulsion polymerization and blended with GR-S 100 latex with and without the addition of the vinylic filler latex.

It is informative to consider the comparative example in Table XV with Example XXII-7 and to note that the cross-linked styrene vinylic filler of the latter example produced 2000 p.s.i. greater tensile strength than the Pliolite S-3 resin, which on the basis of Table XV is shown to consist essentially of styrene without cross-linking. See also Table VI.

TABLE XIV.—MIXED ELASTOMERS REINFORCED WITH VINYLIC FILLERS

| Compound No. XIV | 1 | 2 |
|---|---|---|
| Elastomer latex (Dry basis): | | |
| Polybutadiene (Table III, Recipe L) | 50 | |
| Butadiene-styrene copolymer (Table III, Recipe M) | 50 | 50 |
| Butadiene-acrylonitrile copolymer [1] | | 50 |
| Vinylic filler latex (Dry basis): | | |
| Quantity | 20 | 20 |
| Composition: | | |
| Methyl methacrylate | 90 | 90 |
| Ethyleneglycoldimethacrylate [2] | 10 | 10 |
| Filler polymerization recipe (Table III) | A | A |
| Compound: | | |
| Recipe (Table XII) | | |
| Compound Mooney, ML-4 | 12 | 52 |
| Cure, minutes at 285° F | 30 | 60 |
| Test results: | | |
| Elongation, percent | 800 | 450 |
| Modulus, 300% | 260 | 1,180 |
| Hardness, Shore A Durometer | 52 | 70 |
| Tensile strength, p.s.i | 1,635 | 2,200 |
| Percent increase in tensile strength | [3] 774 | [4] 598 |

[1] B.F. Goodrich Hycar 1513 (28 pts. acrylonitrile).
[2] Cross-linking agent.
[3] Control tensile strength is 187 p.s.i. the average of the controls from Tables V and VI.
[4] Control tensile strength is 352 p.s.i. the average of the controls from Tables VI and VIII.

TABLE XV.—ELASTOMER VINYL RESIN COMBINATIONS REINFORCED WITH VINYLIC FILLERS

| Compound No. XV | Control | 1 | Control | 2 | Comparison |
|---|---|---|---|---|---|
| Elastomer latex (Dry basis): GR-S 100 (now termed, GR-S 1500) | 100 | 100 | 100 | 100 | 100 |
| Soluble vinyl resin elastomer latex (Dry basis): | | | | | |
| Quantity | 20 | 20 | 20 | 20 | 20 |
| Composition: | | | | | |
| Styrene | 90 | 90 | 80 | 80 | |
| Butadiene | 10 | 10 | 20 | 20 | |
| Pliolite S-3 resin [1] | | | | | 100 |
| Resin polymerization recipe (Table III) | A | A | A | A | |
| Insoluble vinylic filler latex (Dry basis): | | | | | |
| Quantity | | 20 | | 20 | |
| Composition: | | | | | |
| Styrene | | 99.2 | | 99.2 | |
| Divinylbenzene [2] | | 0.8 | | 0.8 | |
| Filler polymerization recipe (Table III) | | B | | B | |
| Compound: | | | | | |
| Recipe (Table XII) | F | F | F | F | F |
| Compound Mooney viscosity, ML-4 | 55 | 87 | 56 | 56 | 51 |
| Cure, minutes at 285° F | 60 | 60 | 90 | 90 | 105 |
| Test results: | | | | | |
| Elongation, percent | 590 | 440 | 425 | 425 | 400 |
| Modulus, 300% | 160 | 770 | 300 | 1,020 | 460 |
| Hardness, Shore A Durometer | 54 | 70 | 54 | 84 | 52 |
| Tensile strength, p.s.i. | 550 | 1,330 | 430 | 1,360 | 560 |
| Percent increase in tensile strength | | 141 | | 216 | |

[1] Pliolite S-3 resin is a dry product of the Goodyear Tire and Rubber Co. and reported to be a styrene resin containing 10–20% butadiene and was milled into GR-S 1500 in this comparison.

[2] Cross-linking agent.

The results obtained clearly demonstrate that the insoluble vinylic filler effects reinforcement of a mixture of elastomer polymers namely the high butadiene-low styrene elastomer with the high styrene low butadiene resin elastomer. Since the vinylic filler is insoluble in both of the elastomers, it follows that the vinylic filler in latex form may be combined with either of the two elastomers in latex form, and the combination coagulated and dried and added to the other dried elastomer on the mill. When the vinylic filler is combined with the vinyl resin it affords a valuable article of commerce for use in the formation of vinylic filler reinforced shoe soles and the like. The dispersion of up to 67% filler in the resin as a carrier misable with an elastomer or plastomer to be reinforced, affords a mode of dispersing the filler within continuum by other than latex blending and the high butadiene elastomer may be regarded as a polymeric plasticizer for the vinyl resin elastomer reinforced with the vinylic filler, which itself becomes reinforced by the vinylic filler, as has been demonstrated by examples of mixtures heretofore cited in Tables XIV and XV. For reinforcement of a mixture of two elastomers, see Table IX and for reinforcement of mixtures of elastomers and plastomers, see Example XI-3, and Table XXVI.

Tables XVI to XIX refer to fillers containing carboxylic acid groups.

As above cited, I have found that this special new class in the group of vinylic fillers, namely, the carboxylic vinylic fillers prepared from a vinyl- or allyl-acid, or an acidic cross-linking agent, or an acidic derivative obtained from reactions on the double bond of a vinylic filler having residual unsaturation, not only have excellent reinforcing properties themselves (demonstrated by the examples in Tables XVI and XVII) but also have exceptional reinforcing properties when compounded with certain compounding ingredients that aid and augment the reinforcing effect of the fillers when the latter are carboxylic in type, for example ammonia or a mono-, di-, tri-, or tetra substituted organic ammonium compound.

As the reinforcement aiding effect of this new combination is accomplished with low amounts of carboxylic content in this vinylic filler (Table XVIII), the remaining portion of the vinylic filler may be selected from the relatively inexpensive members of the vinyl-allyl class, such as styrene and divinylbenzene as illustrated herein, especially in Tables XVI and XVIII.

Referring to Table XVII when ammonia or the more volatile amines are used the stocks must be compounded and cured immediately, whereas with the higher molecular weight amines of low volatility, the stocks may be stored between compounding curing. However, the higher molecular weight amines do not appear as effective in augmenting the reinforcing properties of the vinylic fillers as the lower molecular weight amines and therefore it is preferable to employ amines, as exemplified in Table XVII, with not over seven carbon atoms per amino group present.

By the introduction of nitrile groups the volatility of low molecular weight amines can be decreased and, as is being set forth in a copending application of one of my co-workers, Dr. René G. Jennen, Ser. No. 556,423, filed Dec. 3, 1955, he has discovered that the introduction of such nitrile groups with proper configuration not only does not impair the reinforcement enhancing effect of the low molecular weight amines compounding ingredients when used in conjunction with polymeric materials containing carboxylic groups as herein disclosed, but also unexpectedly imparts to the compounded stocks excellent resistance to deterioration due to aging. Thus while an amino-nitrile is referred to in the examples in the tables it is to be understood that such reference is to illustrate the broad concept of the present invention and not to lay claim to the improvement discovered by Dr. Jennen.

In all the examples of Tables XVI to XIX, the carboxylic vinylic fillers were latex-blended with latices of the materials to be reinforced and the blended latices were then salt-acid coagulated, dried and compounded, the vulcanizable materials being then cured.

Table XIX demonstrates the effect of the quantity of cross-linking agent, in this instance, divinylbenzene on the characteristics of the vinylic filler and the reinforcing properties of such filler in synthetic rubber. To obtain 3,000 p.s.i. tensile strengths for a GR-S 1500 vulcanizate reinforced with a carboxylic vinylic filler according to Table XIX it requires such filler contain 10% polymerized divinylbenzene, however, other vinylic monomers such as vinyl toluene may require less divinylbenzene, e.g., 5% to produce a vinylic filler with maximum reinforcing properties attributable to the cross-linking agent.

It will be noted in connection with Table XVI that carboxylic vinylic filler reinforcement of class II–C elastomers is exemplified in Table IX, and it will be understood that in lieu of monomers having carboxylic groups monomers may be employed in which sulfur replaces one or both of the oxygens in the carboxyl group.

TABLE XVI.—CARBOXYLIC VINYLIC FILLER REINFORCEMENT OF REPRESENTATIVE ELASTIC AND PLASTIC MATERIALS AND AUGMENTATION BY COMPOUNDING WITH AMINES

| Compound No. XVI | 1 | 2 | 3 | 4 | 5 | 6 |
|---|---|---|---|---|---|---|
| Elastic and plastic materials latices (Dry basis): | | | | | | |
| I Natural rubber | 100 | | | | | |
| IIA-1 Polybutadiene (Table III, Recipe L) | | 100 | | | | |
| IIA-2 GR-S 1500 (Table III, Recipe M) | | | 100 | | | |
| IIB-1 Polychloroprene (Neoprene #571) | | | | 100 | | |
| IIB-2 Butadiene-acrylonitrile copolymer (Hycar 1514) | | | | | 100 | |
| III Vinylchloride-vinylidene chloride copolymer (Dow latex 744B) [1] | | | | | | 100 |
| Vinylic filler latex (Dry basis): | | | | | | |
| Quantity | 20 | 20 | 20 | 20 | 20 | 20 |
| Composition: | | | | | | |
| Acrylic acid | 10 | 10 | | 10 | 10 | 10 |
| Methacrylic acid | | | 10 | | | |
| Styrene | 78 | 78 | 80 | 78 | 80 | 80 |
| Butadiene | 2 | 2 | | [2]2 | | |
| Divinylbenzene [3] | 10 | 10 | 10 | 10 | 10 | 10 |
| Filler polymerization recipe (Table III) | F | F | F | F | A | A |
| Compound: | | | | | | |
| Recipe (Table XII) | A | C | E | G | E | |
| Allylamine | 3 | 3 | 3 | 3 | 3 | |
| Compound Mooney viscosity, ML-4 | 29 | 36 | 46 | 200+ | 59 | |
| Cure, minutes at 285° F | 45 | 45 | 20 | 30 | 60 | |
| Test results: | | | | | | |
| Elongation, percent | 725 | 1,155 | 825 | 345 | 560 | 60 |
| Modulus, 300% | 500 | 170 | 375 | 1,580 | 580 | |
| Hardness, Shore A Durometer | 54 | 49 | 63 | 72 | 60 | |
| Tensile strength, p.s.i | 4,560 | 1,040 | 3,725 | 1,900 | 1,850 | 2,370 |
| For controls see Table, Example | IV, C | V, C | VI, C | VII, C | VII, C | X, C |
| Percent increase in tensile strength | 47 | 550 | 1,633 | 68 | 325 | 94 |

[1] 80 pts. of vinylchloride-vinylidene chloride copolymer was plasticized with 20 pts. dioctylphthalate.
[2] Isoprene in place of butadiene.
[3] Cross-linking agent.

TABLE XVII.—CARBOXYLIC VINYLIC FILLERS WITH REPRESENTATIVE AMINES AS REINFORCEMENT AIDERS

| Compound No. XVII | Control | 1 | 2 | 3 | 4 | 5 | 6 | 7 | 8 | 9 | 10 | 11 |
|---|---|---|---|---|---|---|---|---|---|---|---|---|
| Elastomer latex (Dry basis): GR-S 1500 (Table III Recipe M) | 100 | 100 | 100 | 100 | 100 | 100 | 100 | 100 | 100 | 100 | 100 | 100 |
| Vinylic filler latex (Dry basis): | | | | | | | | | | | | |
| Quantity | 20 | 20 | 20 | 20 | 20 | 20 | 20 | 20 | 20 | 20 | 20 | 20 |
| Composition [1] | | | | | | | | | | | | |
| Compound: | | | | | | | | | | | | |
| Recipe (Table XII) | F | I | C | C | C | C | C | C | C | C | C | C |
| Ammonia derivatives | | 0 | | | | | | | | | | |
| Aqueous ammonia (28%) | | | 4 | | | | | | | | | |
| Allylamine | | | | 3 | | | | | | | | |
| n-Propylamine | | | | | 3 | | | | | | | |
| Di-n-propylamine | | | | | | 3 | | | | | | |
| Isopropylamine | | | | | | | 3 | | | | | |
| Diisopropylamine | | | | | | | | 3 | | | | |
| Diallylamine | | | | | | | | | 3 | | | |
| Tri-N-butylamine | | | | | | | | | | 6 | | |
| 50% Trimethylbenzyl ammonium hydroxide | | | | | | | | | | | 10 | |
| N-isopropylglucamine | | | | | | | | | | | | 6 |
| Compound Mooney viscosity, ML-4 | 37 | 60 | 46 | 44 | 44 | 41 | 44 | 43 | 45 | 46 | 47 | 56 |
| Cure, minutes at 285° F | 90 | 120 | 90 | 45 | 60 | 60 | 60 | 45 | 90 | 60 | 60 | 60 |
| Test results: | | | | | | | | | | | | |
| Elongation | 320 | 330 | 850 | 720 | 650 | 650 | 655 | 720 | 755 | 730 | 750 | 780 |
| Modulus, 300% | 160 | 1,800 | 330 | 550 | 445 | 495 | 490 | 380 | 440 | 330 | 330 | 330 |
| Hardness, Shore A Durometer | 39 | 46 | 55 | 63 | 65 | 60 | 63 | 58 | 62 | 58 | 58 | 59 |
| Tensile strength, p.s.i | 215 | 2,030 | 2,720 | 3,205 | 2,985 | 3,010 | 3,345 | 3,240 | 3,120 | 2,830 | 2,360 | 2,460 |
| Percent increase in tensile strength | | 844 | 1,165 | 1,390 | 1,288 | 1,300 | 1,456 | 1,407 | 1,351 | 1,216 | 997 | 1,044 |

[1] Emulsion copolymer 78 pts. styrene, 10 pts. acrylic acid, 2 pts. isoprene and 10 pts. divinylbenzene (cross-linking agent) polymerized according to Recipe F. Table III was used in all examples except compounds 9 through 11 in which 2 pts. of methacrylic acid was substituted for the 2 pts. acrylic acid.

TABLE XVIII.—VARIATION OF CARBOXYLIC CONTENT OF VINYLIC FILLER EFFECTING TIME OF CURE ONLY

| Compound No. XVIII | Control | 1 | 2 | 3 | 4 | 5 |
|---|---|---|---|---|---|---|
| Elastomer latex (Dry basis): GR-S 1500 (Table III, Recipe M) | 100 | 100 | 100 | 100 | 100 | 100 |
| Vinylic filler latex (Dry basis): | | | | | | |
| Quantity | | 20 | 20 | 20 | 20 | 20 |
| Composition: | | | | | | |
| Styrene | | 89 | 88 | 87 | 85 | 80 |
| Methacrylic acid | | 1 | 2 | 3 | 5 | 10 |
| Divinylbenzene [1] | | 10 | 10 | 10 | 10 | 10 |
| Filler polymerization recipe (Table III) | | F | F | F | F | F |
| Compound: | | | | | | |
| Recipe (Table XII) | F | F | E | E | E | E |
| 1,2-dihydro-2,2,4-trimethylquinoline | | 1 | 1 | 1 | | |
| Phenylbetanaphthylamine | | | | | 1 | 1 |
| Amitrile I.P. [2] | | 2 | 2 | 2 | 3 | 4 |
| Compound Mooney viscosity, ML-4 | 37 | 49 | 49 | 48 | 50 | 50 |
| Cure, minutes at 285° F | 90 | 30 | 45 | 60 | 90 | 90 |
| Test Results: | | | | | | |
| Elongation, percent | 320 | 740 | 690 | 720 | 650 | 700 |
| Modulus, 300 percent | 160 | 475 | 500 | 480 | 550 | 530 |
| Hardness, Shore A Durometer | 39 | 62 | 62 | 65 | 65 | 64 |
| Tensile strength, p.s.i | 215 | 3,055 | 3,100 | 3,100 | 3,000 | 3,125 |
| Percent increase in tensile strength | | 1,320 | 1,342 | 1,342 | 1,295 | 1,353 |

[1] Cross-linking agent.
[2] Amitrile I.P. is alpha-isopropylaminopropionitrile.

TABLE XIX.—CARBOXYLIC VINYLIC FILLERS EFFECT OF DVB

| Compound No. XIX | Control | 1 | 2 | 3 | 4 | 5 | 6 |
|---|---|---|---|---|---|---|---|
| Elastomer latex (Dry basis) GR-S 1500 (Recipe M, Table III) | 100 | 100 | 100 | 100 | 100 | 100 | 100 |
| Vinylic filler latex (Dry basis): | | | | | | | |
| Quantity | | 20 | 20 | 20 | 20 | 20 | 20 |
| Composition: | | | | | | | |
| Styrene | | 94 | 93 | 92 | 90 | 87 | 85 |
| Methacrylic acid | | 5 | 5 | 5 | 5 | 5 | 5 |
| Divinylbenzene (DVB)* | | 1 | 2 | 3 | 5 | 8 | 10 |
| Filler polymerization recipe (Table III) | | F | F | F | F | F | F |
| Compound: | | | | | | | |
| Recipe (Table XII) | F | E | E | E | E | E | E |
| Amitrile I.P | | 3 | 3 | 3 | 3 | 3 | 3 |
| Compound Mooney viscosity, ML-4 | 37 | 52 | 50 | 51 | 53 | 55 | 59 |
| Cure, Minutes at 285° F | 90 | 45 | 45 | 45 | 60 | 60 | 60 |
| Test results: | | | | | | | |
| Elongation, percent | 320 | 800 | 750 | 780 | 710 | 690 | 680 |
| Modulus, 300% | 160 | 440 | 440 | 445 | 555 | 475 | 560 |
| Hardness Shore A Durometer | 39 | 61 | 59 | 63 | 63 | 64 | 63 |
| Tensile strength, p.s.i | 215 | 1,790 | 1,970 | 2,710 | 2,750 | 2,765 | 3,050 |
| Percent increase in tensile strength | | 732 | 816 | 1,160 | 1,179 | 1,186 | 1,319 |

*Cross-linking agent.

With respect to these three tables, it will be appreciated that in Table XVI, Examples XVI-6, the reinforcement of a non-vulcanizable plastomer with the carboxylic vinylic filler alone was nearly half again as great as that in Examples X-1 and X-2 with non-carboxylic fillers that in Example XVI-1 the reinforcement of the vulcanizable natural rubber with the aid of an amine in the compounding formula was substantially the same as that effected by the much more expensive polar vinylic filler employed in Example IV-2, and that in Example XVI-3 the reinforcement of the GR-S 1500 copolymer by the carboxylic filler with the aid of the amine compounding ingredient was greater than that effected by the more expensive polar vinylic filler employed in Example VI-2. Further it is to be noted from Table XVII that while the different ammonia type compounding ingredients (Examples XVII-2 through -8) varied somewhat the hardness and tensile strength of the cured reinforced stock, all of them, as compared with Example XVII-1 omitting such ammonia derivatives, augment the reinforcing effect of the carboxylic vinylic fillers. Finally Table XVIII shows that reduction of the carboxylic content of the vinylic fillers from 10% to as low as 1% causes no appreciable decrease in reinforcing effect, when aided by the ammonia compounding ingredient, leading inevitably to the conclusion that further reduction in this content is possible, to the point where it would not appreciably increase the curing time needed as compared to its entire omission, without loss of its beneficial effect.

Table XX is representative of natural rubber reinforced with polar vinylic fillers with different cross-linking agents. When the principle vinyl monomer of the vinylic filler used with acrylonitrile, ethylene-glycoldimethacrylate and allylacrylate both gave higher values than when divinylbenzene was used as the cross-linking agent. When methylmethacrylate was the principle vinyl monomer in the vinylic filler then the type of cross-linking agent used has little effect on this filler's ability to reinforce natural rubber. However, in all cases the vinylic filler materially improved the already considerable gum tensile strength of the natural rubber. The latter is frequently attributed to the tendency of the natural rubber to crystallize on stretching. From the observations on natural rubber it could not be predicted that the vinylic fillers would improve the ordinarily much lower gum tensile strengths of synthetic elastomers that exhibit no such crystallization characteristic, any more than it could be predicted that because a vinylic filler was found to reinforce a synthetic elastomer, it could be expected to further reinforce a self-reinforcing natural rubber.

TABLE XX.—NATURAL RUBBER REINFORCED WITH POLAR VINYLIC FILLERS WITH DIFFERENT CROSS-LINKING AGENTS

| Compound No. XX | Control | 1 | 2 | 3 | 4 | 5 | 6 |
|---|---|---|---|---|---|---|---|
| Rubber and elastomer latices (Dry basis): Natural rubber | 100 | 100 | 100 | 100 | 100 | 100 | 100 |
| Vinylic filler latex (Dry basis): | | | | | | | |
| Quantity | | 20 | 20 | 20 | 20 | 20 | 20 |
| Composition: | | | | | | | |
| Acrylonitrile | | 95 | 95 | 95 | | | |
| Methylmethacrylate | | | | | 99 | 90 | 90 |
| Divinylbenzene [1] | | 5 | | | 1.0 | | |
| Ethyleneglycoldimethacrylate [1] | | | | | | 10 | |
| Allylacrylate [1] | | | 5 | 5 | | | 10 |
| Filler polymerization recipe (Table III) | | E | E | E | [2] A | [2] A | [2] A |
| Compound: | | | | | | | |
| Recipe (Table XII) | A | A | A | A | A | A | A |
| Compound Mooney viscosity, ML-4 | 31 | 66 | 68 | 68 | 50 | 52 | 59 |
| Cure, minutes at 285° F | 60 | 60 | 30 | 45 | 30 | 45 | 48 |
| Test results: | | | | | | | |
| Elongation, percent | 820 | 770 | 790 | 795 | 730 | 825 | 760 |
| Modulus, 300% | 200 | 420 | 440 | 500 | 510 | 350 | 446 |
| Hardness Shore A Durometer | 37 | 58 | 56 | 59 | 57 | 54 | 45 |
| Tensile strength, p.s.i | 3,100 | 3,960 | 4,775 | 4,590 | 3,810 | 3,850 | 3,920 |
| Percent increase in tensile strength | | 28 | 54 | 48 | 23 | 24 | 29 |

[1] Cross-linking agent.
[2] Recipe A except 5 pts. Santomerse-3 and 0.5 pts. diisopropylbenzene hydroperoxide.

Table XXI represents vinylic fillers that have been prepared by inter- or graft-polymerization. This technique is very advantageous as I have already stated, for reducing the cost of a vinylic filler.

ples XXI-5, -6, and -7 with the non-acid fillers of Examples XXI-1 through -4, it will be noted that the acid group containing graft polymer fillers gave even better reinforcing results than the non-carboxylic containing

TABLE XXI.—GR-S REINFORCED WITH TWO STEP INTERPOLYMERIC VINYL FILLERS

| Compound No. XXI | Control | 1 | 2 | 3 | 4 | 5 | 6 | 7 |
|---|---|---|---|---|---|---|---|---|
| Elastomer latex (Dry basis): GR-S 1500 (Table III, Recipe M) | 100 | 100 | 100 | 100 | 100 | 100 | 100 | 100 |
| Vinylic filler latex (Dry basis): | | | | | | | | |
| Quantity | | 20 | 20 | 20 | 20 | 20 | 20 | 20 |
| Composition: | | | | | | | | |
| Polymerization Step I: | | | | | | | | |
| Styrene | | 90 | 90 | 90 | 90 | 61 | 60 | 50 |
| Divinylbenzene* | | 10 | 10 | 10 | 10 | 8 | 8 | 8 |
| Polymerization Step II: | | | | | | | | |
| Styrene | | | | | | 25 | 25 | 30 |
| Methacrylic acid | | | | | | 4 | 5 | 10 |
| Vinyl toluene | | | | 5 | | | | |
| Ethyleneglycoldimethacrylate* | | 5 | | | | | | |
| Divinylbenzene* | | | 5 | | | 2 | 2 | 2 |
| Allylacrylate* | | | | | 5 | | | |
| Triallylcyanurate* | | | | | 10 | | | |
| Filler polymerization recipe (Table III) | | A | A | A | A | A | A | A |
| Compound: | | | | | | | | |
| Recipe (Table XII) | F | K | K | K | K | K | K | K |
| Amitrile I.P. | | | | | | 2 | 2 | 2 |
| Compound Mooney viscosity, ML-4 | 37 | 50 | 50 | 48 | 45 | 51 | 51 | 55 |
| Cure, minutes at 285° F | 90 | 60 | 60 | 60 | 60 | 90 | 90 | 90 |
| Test results: | | | | | | | | |
| Elongation, percent | 320 | 650 | 620 | 650 | 600 | 630 | 640 | 660 |
| Modulus, 300% | 160 | 420 | 435 | 440 | 450 | 535 | 520 | 540 |
| Hardness, Shore A Durometer | 39 | 61 | 63 | 63 | 62 | 67 | 69 | 70 |
| Tensile strength, p.s.i | 212 | 2,320 | 2,650 | 2,240 | 2,130 | 3,120 | 3,025 | 2,870 |
| Percent increase in tensile strength | | 994 | 1,150 | 957 | 904 | 1,372 | 1,327 | 1,254 |

*Cross-linking agent.

It is informative to compare the data of the examples in Table XXI with those of the examples in Table XVIII. First it will be noted that Table XVIII indicated that even with the carboxylic vinyl component distributed throughout the filler particles, reduction of its quantity from 10 parts to 1 part based on 100 parts, did not appreciably reduce the reinforcement effected by the carboxylic constituent, but that such reduction did lower the time of cure from 90 minutes to about 30 minutes. It will be noted that in Examples XXI-7, -6, and -5, ten, five and four parts respectively of carboxylic vinyl were graft-polymerized on the surface of an already insoluble styrene-divinyl benzene polymer particle; that these quantities, particularly when localized at the surface, were in much greater concentration than the corresponding quantities in Table XVIII and that all of them are so great as to require 90 minutes curing time (cf. Table XVIII); that furthermore reduction of these excess quantities from 10 to 4 parts increased the reinforcing effect; that from these facts in connection with the deductions from Table XVIII, it appears thus still further reduction of the carboxylic vinyl component of the graft polymerized fillers would not reduce, and indeed might be expected to further increase the effective reinforcement obtained.

Comparing the acid group containing fillers of Examples XXI-5, -6, and -7 with the non-acid fillers of Examples XXI-1 through -4, it will be noted that the acid group containing graft polymer fillers gave even better reinforcing results than the non-carboxylic containing fillers, paralleling the experience with the one-step copolymerized fillers.

Further, Example XXXI-2 (which is the same as Example I-5 and is the only example duplicated in this specification) is of interest as showing a non-polar grafted filler reinforcing the non-polar GR-S 1500 as well as certain polar grafted fillers, but comparison with Example I-3 where the filler consisted entirely of vinyl toluene cross-linked with divinyl benzene, and with Example VI-1 where it consisted entirely of styrene cross-linked with divinyl benzene, shows that the graft polymer filler, utilizing less of the vinyl toluene with styrene and divinylbenzene, gave reinforcement superior to either of these other non-polar fillers.

Table XXI-A illustrates further examples of interpolymeric vinylic fillers. This table shows vinylic fillers capable of rendering good reinforcement can be formed by seeding the vinylic filler polymerization with a preformed synthetic elastomer latex or natural rubber latex. In these filler examples the quantity of elastomer latex used was kept low, however, it may be increased without excessively reducing the reinforcing properties of the vinylic filler. This table further illustrates that grafting or surfacing a vinylic filler particle effects its reinforcing properties to a greater degree than does alterations in the character of the core of the vinylic filler.

TABLE XXI-A.—GR-S REINFORCED WITH INTERPOLYMERIC VINYLIC FILLERS

| Compound No. XXI-A | Control | 1 | 2 | 3 | 4 | 5 |
|---|---|---|---|---|---|---|
| Elastomer latex (Dry basis): GR-S 1500 (Table III, Recipe M) | 100 | 100 | 100 | 100 | 100 | 100 |
| Vinylic Filler latex (Dry basis): | | | | | | |
| Quantity | | 20 | 20 | 20 | 20 | 20 |
| Composition: | | | | | | |
| Natural rubber latex [1] | | 5 | | | | |
| GR-S 1500 latex [1] | | | 5 | | | |
| Polybutadiene latex [1,2] | | | | 5 | | |
| Polychloroprene latex [1,3] | | | | | 5 | |
| Butadiene-acrylonitrile latex [1,4] | | | | | | 5 |
| Vinyl monomers: | | | | | | |
| Styrene | | 80 | 80 | 80 | 80 | 80 |
| Methacrylic acid | | 10 | 10 | 10 | 10 | 10 |
| Divinylbenzene [5] | | 10 | 10 | 10 | 10 | 10 |
| Filler polymerization recipe (Table III) | | A | A | A | A | A |
| Compound: | | | | | | |
| Recipe Table XII | F | E | E | E | E | E |
| α-isopropylaminopropionitrile | | 4 | 4 | 4 | 4 | 4 |
| Compound Mooney vis., ML-4 | 37 | 45 | 49 | 46 | 48 | 49 |
| Cure, minutes at 285 F | 90 | 90 | 60 | 75 | 60 | 30 |
| Test results: | | | | | | |
| Elongation, percent | 320 | 715 | 710 | 745 | 735 | 790 |
| Modulus, 300% | 160 | 465 | 430 | 400 | 420 | 370 |
| Hardness, Shore A Durometer | 39 | 64 | 61 | 60 | 62 | 58 |
| Tensile strength, p.s.i | 215 | 2,725 | 2,730 | 2,730 | 2,950 | 2,790 |
| Percent increase in tensile strength | | 1,167 | 1,169 | 1,169 | 1,272 | 1,197 |

[1] Dry basis.
[2] Recipe L—Table III.
[3] Neoprene latex #571 E.I. duPont de Nemours and Co.
[4] B.F. Goodrich Hycar latex 1514.
[5] Cross-linking agent.

Table XXII summarizes examples utilizing emulsifier-free vinylic fillers. These emulsifier-free vinylic filler latices are prepared in systems where no emulsifier is employed and such fillers are very useful in reinforcing polymers requiring good electrical properties and in other uses where the presence of an emulsifier would be detrimental.

Table XIII gives the composition of certain vinylic fillers examined under the election microscope, either per se, or dispersed in natural or synthetic rubber.

Four sizes of vinylic fillers within the aforesaid size range were prepared in these examples as indicated in the table. In each of Examples XXIII-1 through -4, electron microphotographs were taken of the dried vinylic latex

TABLE XXII.—VINYLIC FILLERS EMULSIFIER-FREE AND COMPARISONS

| Compound No. XXII | 1 | 2 | 3 | 4 | 5 | 6 | 7 | 8 |
|---|---|---|---|---|---|---|---|---|
| Rubber and elastomer latex (Dry basis): | | | | | | | | |
| Natural rubber | 100 | | | | | | | |
| Polychloroprene (Neoprene latex #571) | | | 100 | 100 | 100 | | | |
| GR-S 1500 (Table III, Recipe M) | | 100 | | | | 100 | 100 | [1] Mixture |
| Vinylic filler latex (Dry basis): | | | | | | | | |
| Quantity | 20 | 20 | 20 | 20 | 20 | 20 | 20 | |
| Composition: | | | | | | | | |
| Styrene | 96 | 96 | 99 | 98 | 98 | 98 | 98 | |
| Methacrylic acid | 2 | 2 | | | | | | |
| N-tert-butylacrylamide | | | | 1 | | | | |
| N,N-diallylmelamine [2] | | | | | 1 | | | |
| Divinylbenzene [3] | 2 | 2 | 1 | 1 | 1 | 2 | 2 | |
| Polymerization, emulsifier-free recipe (Table III) | G | G | G | G | I | G | | |
| Polymerization, emulsifier recipe (Table III) | | | | | | | [3] A | |
| Compound: | | | | | | | | |
| Recipe (Table XII) | A | E | G | G | G | E | E | E |
| Allylamine | 1.5 | 2.0 | | | | | | |
| Compound Mooney vis., ML-4 | 12 | 43 | 200+ | 200+ | 200+ | 47 | 53 | 48 |
| Cure, minutes at 285° F | 30 | 30 | 60 | 60 | 60 | 30 | 30 | 30 |
| Test results: | | | | | | | | |
| Elongation, percent | 705 | 580 | 365 | 400 | 480 | 830 | 900 | 890 |
| Modulus, 300 percent | 430 | 460 | 1535 | 1200 | 940 | 222 | 390 | 290 |
| Hardiness, Shore A Durometer | 54 | 62 | 70 | 60 | 69 | 48 | 54 | 48 |
| Tensile strength, p.s.i. | 3,420 | 1,670 | 1,820 | 1,390 | 1,440 | 830 | 2,560 | 1,975 |
| For control see Table, Example | IV, C | VI, C | VII, C | VII, C | VII, C | VI, C | VI, C | VI, C |
| Percent increase in tensile strength | 10 | 677 | 61 | 23 | 27 | 286 | 1,090 | 818 |

[1] Equal parts of GR-S-vinylic filler latex combinations XXII-6 and XXII-7 were blended then coagulated and cured. It is noteworthy that this blend of relatively large and relatively small colloidal sized vinylic filler particles yielded tensile strength over 11% greater than the average of the two component values.
[2] Cross-linking agent.
[3] 6 pts. instead of 10 pts. Santomerse-3, polymerization temperature 60° C.

In Example XXII-4 N-tert-butylacrylamide is included to give an emulsifier-free acid amide vinylic filler which will, to a degree, reinforce a polar polymer like polychloroprene. Such a high polarity vinylic filler is useful in reinforcing the plastomers.

In Example XXII-5 N,N-diallylmelamine is included to give an example of a vinylic filler with basic amine groups as such fillers are very useful as they have broad application in the field of rubber, elastomer and plastomer reinforcement.

The particle size of the emulsifier-free vinylic filler is governed to a minor degree by the water solubility of the monomers, the dilution of the monomers with the water and the ion effect from soluble salts and to a major degree by the number of polymerization-initiating free radicals present, as these will each initiate, if active, a particle. Therefore, by reducing the amount of catalyst in the recipe used to produce the examples in Table XXI large particles will be produced until finally the filler particles are too large to be highly effective reinforcers, at which point they are no longer held in suspension by Brownian movement and in preparing emulsifier-free vinylic fillers the water content of the latex must be such that the filler particles will not agglomerate and coagulate with a psuedo-settling effect. When such psuedo-settling occurs further dilution in preparation of the latex or adjustment of the ion concentration therein or both, may be required. Thus by controlling the colloidal particle size on the one hand by varying the amount of catalyst to produce the larger size range of particles and on the other hand by using varying amounts of emulsifier for the small size range of particles the complete spectral range of colloidal particle size can be spanned with latices which are milk white in color to latices which are transparent. Where particles with pigmenting effect are desired, the larger colloidal particles are employed. Intermediate sizes may be selected where a colloidal sheen is desired, smaller sizes where transparency is wanted.

which were shadow cast by using the high vacuum sputtering technique employing vaporized palladium metal and such electron microphotographs were taken at a magnification of 48,000 times.

Examples XXIII-1 and -2 represent the larger particle sizes of vinylic filler and these were prepared as is seen in Table XXIII by polymerizing the monomers in water without the aid of an emulsifier and the resultant latices were very stable and no particles settled out. Because of their large particle size, the latices were very milky in appearance.

Examples XXIII-3 and -4 represent the smaller particle size vinylic fillers and as seen from Table XXIII these latices were prepared by emulsion polymerization techniques using an emulsifier. While the latex of Example XIII-3 showed some slight turbidity the latex of Example XIII-4 was practically water clear which is of special value when the vinylic fillers are to be used in transparent elastic or plastic materials especially when reinforcing plastomers.

Example XIII-5 represents the vinylic filler of Example XXIII-2 dispersed in natural rubber. In this case the vinylic filler and the natural rubber were latex-blended, coagulated, dried and the resulting reinforced natural rubber mass was milled and then frozen with liquid nitrogen and broken and the fresh surface was lightly touched to the specimen grid of the electron microscope. Microphotographs were taken at an amplification of 48,000 times as in the other examples of the table, which showed that the vinylic filler was well dispersed in the natural rubber.

Example XIII-6 represents the vinylic filler illustrated in Example XIII-3 dispersed in GR-S 1500 and prepared the same as the specimen for Example XXIII-5, that is, by latex-blending, coagulating and drying. Again in Example XXIII-6 the electron microscope showed that excellent disperson of a vinylic filler in GR-S 1500 type synthetic rubber is accomplished by the latex-blending of the vinylic filler latex and the GR-S 1500 latex.

As illustrated by Example XIII-5 and -6 the vinylic fillers of this invention are easily discernible by the electron miscroscope and this fact coupled with the determination that the particles are insoluble in solvents provides an easy criterion to determine when this invention is being practiced.

from the class consisting of the non-metallic elements of Groups VI-A and VII-A of the Periodic Table, especially such non-metallic reactive elements as oxygen, flourine, chlorine, bromine, iodine, sulfur, and the like which produce pronounced modification in the physical and chemical properties of the vinylic filler and such are capable of further reaction such as amination, hydrolysis, oxidation and reduction followed by neutralization and esterification

TABLE XXIII.—VINYLIC FILLERS PHOTOGRAPHED WITH THE ELECTRON MICROSCOPE

| Compound No. XXIII | 1 | 2 | 3 | 4 | 5 | 6 |
|---|---|---|---|---|---|---|
| Elastomer latex (Dry basis): | | | | | | |
| Natural rubber | | | | | 100 | |
| GR-S 1500 | | | | | | 100 |
| Vinylic filler latex (Dry basis): | | | | | | |
| Quantity | | | | | 20 | 20 |
| Composition: | | | | | | |
| Styrene | 93 | 80 | 78 | | 80 | 78 |
| Acrylonitrile | 5 | | | | | |
| Methylmethacrylate | | | | 80 | | |
| Isoprene | | | 2 | | | 2 |
| Butadiene | | | | 10 | | |
| Methacrylic acid | | 10 | | | 10 | |
| Acrylic acid | | | 10 | | | 10 |
| Ethyleneglycoldimethacrylate [1] | | | | 10 | | |
| Divinylbenzene [1] | 2 | 10 | 10 | | 10 | 10 |
| Polymerization recipe (Table III) | (²) | G | F | A | G | F |
| Vinylic filler particle size range [3] | L | ML | MS | S | ML | MS |

[1] Cross-linking agent.
[2] Monomers, 100 parts; water, 600 parts; potassium persulfate, 3.0 parts; sodium bisulfite; 1.2 parts.
[3] L=Large; ML=Medium-large; MS=Medium-small; S=Small.

Table XXIV illustrates the effects of chemical treatment of unsaturated vinylic fillers. Unsaturation in a vinylic filler permits especially in latex form many reactions which can chemically modify the vinylic filler. For example oxygenated radicals can be attached to the double bond. Thus, in manufacturing the vinylic filler the amount of unsaturation may be controlled and thus the extent of chemical modification, and as I have shown in the case of the carboxylic vinylic fillers small amounts of active groups can materially effect the reinforcing character of the vinylic filler. Vinylic fillers must be rigid and I therefore restrict the vinylic fillers when produced by inclusion of a diene, to a diene monomer content which will yield rigid spheres and I have found that 22% or less of butadiene with styrene and a cross-linking agent will yield a vinylic filler particle which is rigid.

Similarly other conjugated dienes may be employed within the rigidity maintaining limit, such as bodied or unbodied oiticica oil, tung oil and other oils having conjugated double bonds derived from linseed oil, soya bean oil, perrilla oil, castor oil and the like.

I have found that in latex form the unsaturation available at the surface of the insoluble vinylic filler particles, is available for chemical reaction, which can take place in a water dispersant phase.

Such unsaturation can be produced by co-, inter-, or mixed polymerizing with the vinylic filler forming material a diene such as butadiene or isoprene within the rigidity-maintaining limit above mentioned, or by polymerizing a divinyl under such conditions that the vinylic filler is cross-linked to insolubility while residual unsaturation remains that may be used for chemical reaction. Typcal of the first procedure are the examples of Table XIV. Typical of the other procedures are Examples II-3; VIA-2 and X-2 having iodine numbers of 6.1, 7.2 and 2.5, respectively. A saturated filler, having an iodine number of zero, is exemplified by Example V-2. For the purposes of the present invention an unsaturated vinylic filler must contain a significant amount of residual unsaturation corresponding to an iodine number of more than one.

When unsaturation is present in the vinylic compound then the filler may be modified by the reaction of at least a part of its residual unsaturation with material selected which further modifies the physical and chemical character of the vinylic filler. Oxidation can be carried out with the aid of a water soluble oxidizing agent such as potassium permanganate or by employing oxygen or air in the presence of a cobalt catalyst or hydrogen peroxide.

An insoluble substance would only with great difficulty be subject to such reactions as I have found the vinylic filler can undergo, however I have discovered that due to the colloidal particle size of the vinylic filler its surface to volume ratio is large, the surface energy is therefor large, and such reactions of the surface-available unsaturated double bonds can take place.

Table XXIV exemplifies the reaction of the unsaturation present in a vinylic filler. I have chosen a graft polymer for this purpose for in such case the underlying colloidal particle is hard, insoluble and infusible and has been grafted with a soft rubber-like polymeric graft which in this example is also cross-linked, however, this is not essential as the base polymer is insoluble. The unsaturated graft dienic polymer is reacted with bromine, this reaction proceeds rapidly when bromine is added to the water latex of the unsaturated vinylic filler. The brominated vinylic filler particles are further reacted with aqueous ammonia by simply mixing the ammonia with the brominated vinylic filler water latex and placing in a closed vessel and raising the temperature to 100° C. or thereabouts and leaving overnight after which time the reaction is complete and the bromine has been substantially removed from the particles.

In a like manner in Example XXIV-6 a brominated carboxylic filler is treated with caustic soda and enclosed in a vessel heated to about 100° C. and left overnight after which time the bromine is substantially removed from the filler. Strongly oxygenated compounds are insoluble in hydrocarbons and it is noted that the caustic soda-treated brominated vinylic filler is also hydrocarbon repellent which results in a lower degree of reinforcement for this oxygenated vinylic filler in GR-S elastomer. The hydrophilic properties of the caustic soda-treated brominated vinylic fillers are further demonstrated by the ease with which the brominated vinylic filler latex forms a solid precoagulum if it is not first diluted with about ten parts of water before the caustic soda treatment.

TABLE XXIV.—CHEMICAL TREATMENT OF VINYLIC FILLERS CONTAINING UNSATURATION

| Compound No. XXIV | Control | 1 | 2 | 3 | 4 | 5 | 6 |
|---|---|---|---|---|---|---|---|
| Elastomer latex (Dry basis): GR-S 1500 (Table III, Recipe M) | 100 | 100 | 100 | 100 | 100 | 100 | 100 |
| Vinylic filler latex (Dry basis): | | | | | | | |
| Quantity | | 20 | 20 | 20 | 20 | 20 | 20 |
| Composition: | | | | | | | |
| Polymerization Step I: | | | | | | | |
| Styrene | | 80 | 80 | 80 | 70 | 70 | 70 |
| Methacrylic acid | | | | | 10 | 10 | 10 |
| Divinylbenzene * | | 9 | 9 | 9 | 9 | 9 | 9 |
| Polymerization Step II: | | | | | | | |
| Isoprene | | 10 | 10 | 10 | 10 | 10 | 10 |
| Divinylbenzene * | | 1 | 1 | 1 | 1 | 1 | 1 |
| Chemical treatment Step III: Bromine | | 5.7 | 5.7 | | 5.7 | 5.7 | |
| Chemical treatment: | | | | | | | |
| Ammonia 28% | | | | 4 | | | |
| Sodium hydroxide | | | | | | | 2.8 |
| Filler polymerization recipe (Table III) | | A | A | A | A | A | A |
| Compound: | | | | | | | |
| Recipe (Table XII) | F | E | E | E | E | E | E |
| Amitrile I.P | | | | | 4 | 4 | 4 |
| Compound Mooney viscosity, ML-4 | 37 | 39 | 56 | 51 | 50 | 50 | 54 |
| Cure, minutes at 285° F | 90 | 60 | 75 | 75 | 75 | 120 | 150 |
| Test results: | | | | | | | |
| Elongation, percent | 320 | 540 | 630 | 650 | 740 | 815 | 700 |
| Modulus, 300% | 160 | 430 | 650 | 630 | 370 | 390 | 440 |
| Hardness, Shore A Durometer | 39 | 58 | 63 | 65 | 63 | 65 | 65 |
| Tensile strength, p.s.i | 215 | 1,730 | 2,490 | 2,510 | 3,090 | 2,735 | 1,810 |
| Percent increase in tensile strength | | 705 | 1,058 | 1,067 | 1,337 | 1,172 | 784 |

*Cross-linking agent.

Table XXV illustrates carbonylic vinylic fillers and the effect of chemical treatment thereof.

The incorporation of a carbonylic group in a vinylic filler permits the reactions associated with the carbonyl group to be carried out. As typical of fillers containing the carbonyl group the ketone, e.g., methylvinyl ketone, and the aldehyde, e.g., methacrolein, are shown. As a typical reaction is chosen the condensation of a phenol with the vinylic filler containing aldehyde groups.

In Table XXV the carbonylic vinylic filler latex is blended with GR-S 1500 the resulting latex blend being coagulated and dried. Resorcinol is then milled into the dried vinylic filler GR-S blend and the other compounding ingredients are added and the compound cured. The carbonyl containing vinylic fillers yielded substantial reinforcement, and the reinforcing effect was further enhanced by the chemical treatment.

The active carbonylic group in the vinylic fillers is very important especially where it is desirable to tie the vinylic particle to the elastic or plastic materials or to materials incorporated in elastic and/or plastic materials.

TABLE XXV.—CARBONYLIC VINYLIC FILLERS AND CHEMICAL TREATMENT THEREOF

| Compound No. XXV | Control | 1 | 2 | 3 |
|---|---|---|---|---|
| Elastomer latex (Dry basis): GR-S 1500 (Recipe M, Table III) | 100 | 100 | 100 | 100 |
| Vinylic filler latex (Dry basis): | | | | |
| Quantity | | 20 | 20 | 20 |
| Composition: | | | | |
| Styrene | | 80 | 70 | 70 |
| Methyl vinyl ketone | | 10 | | |
| Methacrolein | | | 20 | 20 |
| Divinylbenzene* | | 10 | 10 | 10 |
| Filler polymerization recipe (Table III) | | A | A | A |
| Chemical treatment: Resorcinol | | | | 1 |
| Compound: | | | | |
| Recipe Table XII | F | E | K | K |
| Amitrile I.P | | | 1 | 1 |
| Cure, minutes at 285° F | 90 | 90 | 60 | 105 |
| Compound Mooney vis, ML-4 | 37 | 41 | 54 | 54 |
| Test results: | | | | |
| Elongation, percent | 320 | 600 | 720 | 740 |
| Modulus, 300% | 160 | 470 | 370 | 350 |
| Hardness, Shore A Durometer | 39 | 67 | 58 | 59 |
| Tensile strength, p.s.i | 215 | 2,300 | 2,160 | 2,350 |
| Percnet increase in tensile strength | | 970 | 909 | 999 |

*Cross-linking agent.

Table XXVI illustrates elastomer-plastomer combinations reinforced with vinylic fillers.

From the previous Table XVI through XIX it has been shown that carboxylic vinylic fillers when properly compounded with ammonia or ammonia derivatives have excellent reinforcing properties when used with elastic and plastic materials. Table XXVI gives examples to prove that any vinylic filler can be improved in its ability to reinforce elastic and plastic materials by using in conjunction with it a non-cross-linked resinous material containing carboxyl group and further incorporating therewith ammonia or an ammonia derivative such as a primary, secondary, tertiary or quaternary amine.

In Example XXVI-1 GR-S 1500 latex was blended with a solution of sodium polyacrylate and the resulting blend acid coagulated, dried, compounded and cured. When compared with the control the addition of polyacrylic acid to GR-S 1500 had no effect on its pure gum tensile strength.

In Table VI Example VI-1 shows that a vinylic filler consisting of 90 pts. styrene and 10 pts. divinylbenzene will when latex blended with GR-S 1500, coagulated, compounded, cured and tested give a tensile strength of approximately 2400 p.s.i. Example XXVI-2 shows that the addition of 1 pt. sodium polyacrylate to a GR-S 1500 and a non-carboxylic vinylic filler latex blend when coagulated, dried, compounded and cured gave a tensile strength of approximately 3,000 p.s.i. Similar values were obtained for vinylic fillers containing carboxylic groups (refer to Tables XVI through XIX). Thus, as long as a polymeric material containing carboxylic groups is available which is soluble or capable of being dispersed in the elastic and plastic material and in addition a vinylic filler is also present and a suitable amine is included in the compounding recipe then excellent reinforcement is obtained.

In Table XV the control examples show that a copolymer consisting of styrene with 10% to 20% butadiene is latex blended with GR-S 1500, coagulated, dried, compounded, cured and tested. The resultant tensile strengths are of the order of 500 to 600 p.s.i. However, I have found, as shown in Example XXVI-5, that the inclusion of a small quantity of acrylic acid in such a polymer about doubles the tensile strength yielding a value of 1150 p.s.i.

Examples XV-1 and XV-2 illustrate that the combination of soluble vinyl resin and the insoluble vinylic filler yield tensile values of between 1300 and 1400 p.s.i. Example XXVI-6 shows that if the vinyl resin contains carboxylic groups then the tensile of the vinyl resin-vinylic filler combination is increased to over 2600 p.s.i.

Example XXVI-4 shows that a similar effect can be produced by adding 0.75 pt. of polyacrylic acid to a non-carboxylic containing vinyl resin and vinylic filler combination in GR-S 1500. All of these enhanced tensile values have been obtained by adding an amine to the compounding recipe.

Thus I have discovered that elastic and plastic materials can be reinforced by a combination of a polymeric acidic material and ammonia and/or an amine together with a vinylic filler or by a carboxylic vinylic filler in combination with ammonia and/or amine.

Further, as is apparent from Table XXVI, the polymeric source of carboxyl groups may itself be latex blended with the vinylic filler latex, with or without the addition of ammonia or an amine, to form an article of commerce suitable for compounding with an elastomer or plastomer latex, the latex or dried product resulting from such compounding also forms an article of commerce contemplated by this invention.

latex, the films only have strength providing the latex particles remaining in the film are not isolated by layers of emulsifier which greatly reduce the interparticle adhesion and providing the elastomer latex has high inherent tensile strength or is adequately reinforced. The present research indicates that if the emulsifier is a high molecular weight hydrophilic material the adhesive and cohesive force between the emulsifier, a vinylic filler, and the elastic and plastic material will be sufficient to give a high tensile strength even when the elastomer latex,

TABLE XXVI.—ELASTOMER-PLASTOMER COMBINATIONS REINFORCED WITH VINYLIC FILLERS

| Compound No. XXVI | Control | 1 | 2 | 3 | 4 | 5 | 6 | 7 |
|---|---|---|---|---|---|---|---|---|
| I Elastomer latex (Dry basis): GR-S 1500 (Recipe M, Table III) | 100 | 100 | 100 | 100 | 100 | 100 | 100 | 10 |
| II Elastomer latex (Dry basis): | | | | | | | | |
| Quantity | | | | 20 | 20 | 20 | 20 | 20 |
| Composition: | | | | | | | | |
| Styrene | | | | 85 | 85 | 81 | 81 | 81 |
| Butadiene | | | | 15 | 15 | 15 | 15 | 15 |
| Acrylic Acid | | | | | | 4 | 4 | 4 |
| Polymerization recipe | | | | (¹) | (¹) | (¹) | (¹) | (¹) |
| Plastomer (Dry basis): Polyacrylic acid ² | | 0.75 | 0.75 | 0.75 | 0.75 | | | |
| Vinylic filler latex (Dry basis): | | | | | | | | |
| Quantity | | | 20 | | 20 | | 20 | 20 |
| Composition: | | | | | | | | |
| Styrene | | | 90 | | 90 | | 90 | 80 |
| Methacrylic acid | | | | | | | | 10 |
| Divinylbenzene ³ | | | 10 | | 10 | | 10 | 10 |
| Filler polymerization recipe (Table III) | | | | | | | | |
| Compound: | | | | | | | | |
| Recipe (Table XII) | F | E | E | E | E | E | E | E |
| Amitrile I.P | | 3 | 3 | 3 | 3 | 3 | 3 | 5 |
| Compound Mooney, ML-4 | 37 | 38 | 47 | 42 | 54 | 46 | 59 | 63 |
| Cure, minutes at 285° F | 90 | 60 | 90 | 60 | 60 | 30 | 60 | 90 |
| Test results: | | | | | | | | |
| Elongation, percent | 320 | 280 | 655 | 300 | 615 | 615 | 660 | 800 |
| Modulus, 300% | 160 | | 445 | 500 | 675 | 490 | 680 | 490 |
| Hardness, Shore A Durometer | 39 | 52 | 60 | 63 | 78 | 59 | 78 | 81 |
| Tensile strength, p.s.i | 215 | 230 | 2,920 | 500 | 2,550 | 1,150 | 2,650 | 2,430 |
| Percent increase in tensile strength | | 7 | 1,258 | 182 | 1,086 | 434 | 1,132 | 1,030 |

¹ Polymerization recipe: 100 pts. monomers; 300 pts. water; 1.5 pts. azobis-(isobutyronitrile); 5 pts. Santomerse-3; polymerization temperature, 60° C.; time, 12 hrs.
² Available as sodium polyacrylate from Monomer-Polymer, Inc.
³ Cross-linking agent.

Table XXVII exemplifies the use of polymeric materials as emulsifiers in the formation of vinylic filler latices. Based on the present research I have conceived that the use of vinylic fillers for the reinforcement of synthetic rubber latex for the manufacture of foam sponge or other cast and non-milled products requires that the reinforced elastomer latex be relatively free of materials which reduce surface tension, interfere with sponge foaming or otherwise isolate the latex particles upon drying. Such elastomer latices are not now commercially available.

In the examples of Table XXII emulsifier free vinylic filler latices were provided to contribute toward the objective of a reinforced latex system free of surface-interferring materials but such latices were in the large particle size range and therefor gave only limited reinforcement.

In Table XXVII examples of vinylic fillers are given which are in the smaller size particle range obtainable by emulsion polymerization and yet because the emulsifiers are not of low molecular weight but are of high molecular weight such latices possess the properties desired of a reinforcing material to be used in the production of synthetic rubber foam sponge and of latex cast or dipped articles.

When elastic and plastic materials are cast from a latex, e.g., GR-S does not have a high inherent tensile strength. Thus I have conceived that films of high tensile strength can be obtained from latices of elastic and plastic materials either by using no emulsifier or by using a suitable polymeric emulsifier when forming the latices of the elastic and plastic materials, and such materials can be reinforced by vinylic fillers prepared either without emulsifier or with a suitable polymeric emulsifier.

To date it has been impossible to produce good foam rubber from GR-S type polymers. This conception should enable the utilization of GR-S type latices for this purpose providing the GR-S is prepared with a suitable polymeric emulsifier and providing the vinylic filler used to reinforce the GR-S latex is also prepared free of materials which will prevent such vinylic fillers from reinforcing films deposited from latices.

Thus, the Elastomer Latex in Table XXVII may be prepared by the same recipe M, Table III, but with part or all of the Dresinate 731 replaced by polymeric emulsifier. For example, 4 of the 5 parts of Dresinate in Recipe M may be replaced by about 16 parts of a polymeric emulsifier or hydrophilic polymer exemplified by alpha-protein and acrylamide-styrene-methacrylic acid copolymer in Table XXVII, in preparing the elastomer latex. And similarly, about 5 to 10 parts of maleic anhydride-styrene copolymer (about 1:1 molar monomer ratio, prepared in benzene at 80° C. with 1% benzoyl peroxide) may be employed in the form of a water-soluble alkaline salt, preferably with about 0.2 to 0.5% of a surfactant such as Duponol ME, in lieu of the emulsifier of conventional recipes for producing the latices of elastomer or plastomer or graft polymer materials according to this phase of the present invention. Similarly as set forth more fully in my copending applications Ser. Nos. 642,611 and 538,728 a small proportion of surfactant may be employed with the polymeric emulsifier in forming the vinylic fillers.

TABLE XXVII.—VINYLIC FILLERS PREPARED WITH POLYMERIC EMULSIFIER

| Compound No. XXVII | Control | 1 | 2 |
|---|---|---|---|
| Elastomer latex (Dry basis): GR-S 1500 (Recipe M, Table III) | 100 | 100 | 100 |
| Vinylic filler latex (Dry basis): | | | |
| Quantity | | 20 | 20 |
| Composition: | | | |
| Polymeric emulsifier: | | | |
| α-Protein | | 20 | |
| Acrylamide-styrene-methacrylic acid copolymer | | | 20 |
| Vinyl monomers: | | | |
| Styrene | | 98 | 98 |
| Divinylbenzene [1] | | 2 | 2 |
| Polymerization recipe | | ([2]) | ([3]) |
| Compound: | | | |
| Recipe (Table XII) | F | E | E |
| Amitrile I.P. | | | 2 |
| Compound Mooney, ML-4 | 37 | 48 | Sheared |
| Cure, minutes at 285° F | 90 | 30 | 20 |
| Test results: | | | |
| Elongation, percent | 320 | 560 | 730 |
| Modulus, 300% | 160 | 460 | 560 |
| Hardness, Shore A Durometer | 39 | 63 | 63 |
| Tensile strength, p.s.i. | 215 | 1,450 | 2,780 |
| Percent increase in tensile strength | | 574 | 1,193 |

[1] Cross-linking agent.
[2] Polymerization recipe: 90 pts. styrene; 10 pts. divinylbenzene; 20 pts. α-protein from soya beans (Glidden Co.); 700 pts. water; 2 pts. azobis-(isobutyronitrile); polymerization temperature, 60° C.; time, 12 hrs.; conversion 100%.
[3] Polymerization recipe: Step I—15 pts. acrylamide; 2 pts. methacrylic acid; 3 pts. styrene; 300 pts. water; 0.3 pts. potassium persulfate; 0.15 pts. sodium bisulfite; polymerization temp., 60° C.; time, 2 hrs. Step II—90 pts. styrene; 10 pts. divinylbenzene; 400 pts. water; 2 pts. azobis-(isobutyronitrile); polymerization temp., 60° C.; time, 12 hrs.; conversion 100%.

When the vinylic fillers and/or the elastomers or plastomers are formed with polymeric emulsifiers aided by 1% or less of surfactant based on the weight of monomers charged, the coagulated and washed products so formed are substantially free of non-polymeric emulsifier.

The polymeric emulsifiers are of two classes either of natural origin or of synthetic origin. Alpha protein from soya beans has been chosen to exemplify the class of naturally occurring polymeric emulsifiers. Synthetic polymeric emulsifiers can be produced by polymerizing together monomers with hydrophilic and hydrophobic properties in such ratios to give an emulsifier capable of producing small particle latices. I have prepared a copolymer of acrylamide, styrene and methacrylic acid for this purpose (see Example XXVIII–2). This copolymer was prepared by adding these monomers to water without any emulsifier and then adding the catalyst and polymerizing at 60° C. the solid copolymer settling to the bottom of the container, but redissolving in the water when sufficient caustic soda was added to raise the pH to 8.0, the dispersion then being transparent except for a slight Tyndall color effect. The so dispersed polymer, the vinyl monomers for forming the cross-linked filler particles, and additional catalyst and water were mixed, and the mixture was then subjected to the second step polymerization, to yield the insoluble vinylic filler particles. This procedure may be regarded as a two-step emulsifier-free polymerization in which the first step produces a non-cross-linked saturated vinyl polymer (also a polymeric source of carboxyl groups) and the second step provides the necessary cross-linked material to form the vinylic filler. The so prepared vinylic filler late was blended with GR–S 1500 latex, salt-acid coagulated, dried, and compounded. As will readily be perceived from this example, there are many variations that may be made in the selection of the hydrophobic and hydrophilic monomers, the types of polymerization catalyst, and further by use of modifiers the molecular weight of the first stage polymerization product, referred to as the polymeric emulsifier, may be controlled.

The tables, hereinbefore and hereinafter, set forth examples of vinylic fillers, including those modified by graft polymerization, said vinylic fillers being of the class consisting of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; said vinylic filler being particularly characterized in that said polymer particles contain residual carbon-to-carbon unsaturated groups: and of the foregoing, particularly useful categories are those containing groups from the class consisting of carboxyl, carbonyl and amine groups; those which have been modified by the formation on their surfaces of a condensation product selected from the class consisting of the phenol-aldehyde and amino-aldehyde condensation products; and those which have been modified by the reaction of at least a part of said residual unsaturation with material selected from the class consisting of the non-metallic elements of Groups VI–A and VII–A of the Periodic Table, e.g. oxygen, sulfur, fluorine, chlorine, bromine, etc.

Tables XXX through Table XLII, hereinafter, set forth additional examples of vinylic fillers, including those modified by graft polymerization, said vinylic fillers being of the class consisting of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; said vinylic fillers being particularly characterized in that they fall within one or more of the following categories: the category of vinylic fillers prepared from monomer material selected to include vinylidene monomer containing groups selected from the class consisting of carboxyl, carbonyl and amine groups and combinations thereof; the category of vinylic fillers which have been modified by the formation on their surfaces of a condensation product selected from the class consisting of the phenol-aldehyde and amino-aldehyde condensation products; and the category of vinylic fillers which have been modified by the reaction of said fillers with material selected from the class consisting of the non-metallic elements of Groups VI–A and VII–A of the Periodic Table e.g. oxygen, sulfur, fluorine, chlorine, bromine, etc.

TABLE XXVIII.—REPRESENTATIVE VINYLIC FILLER LATEX AND GR-S CONTROLS POLYMERIZATION RECIPES

| Recipe | A | B | C | D | E | F | G | H | J | K | L |
|---|---|---|---|---|---|---|---|---|---|---|---|
| Monomers | 100 | 100 | 100 | 100 | 100 | 100 | [1] 100 | 100 | 11 | 100 | 100 |
| Water | 300 | 250 | 140 | 300 | 500 | 300 | 180 | 143 | 20 | 110 | 190 |
| Methylene chloride | | | | | 100 | | | | | | |
| Emulsifiers: | | | | | | | | | | | |
| Santomerse-3 [2] | 10 | 5 | | | | | 1.5 | | 3.1 | 7 | |
| Dresinate 731 [3] | | | | | 10 | | | 4.5 | | | 4.5 |
| Duponol Me [4] | | | | | | 10 | 10 | | | | |
| Potassium oleate | | | | 3 | | | | | | | |
| Catalyst systems and modifiers: | | | | | | | | | | | |
| Diisopropylbenzene hydroperoxide | 1.0 | 0.6 | 0.6 | 0.6 | | | 0.1 | 0.25 | 0.5 | 0.6 | |
| Para-menthane hydroperoxide | | | | | | | | | | | 0.5 |
| Azobis-(isobutyronitrile) | | | | | | 1.5 | | | | | |
| Potassium persulfate | | | | | 0.3 | | | | | | |
| Potassium pyrophosphate | 0.21 | 0.07 | 0.21 | 0.07 | | | 0.33 | 0.21 | 0.42 | 0.21 | 0.21 |
| Ferrous sulfate | 0.19 | 0.05 | 0.19 | 0.05 | | | 0.28 | 0.19 | 0.38 | 0.19 | 0.19 |
| MTM [5] | | | 0.2 | | | | | | | | |
| tert-Dodecyl mercaptan | 0.075 | 0.075 | | 0.075 | 0.1 | | 0.35 | 0.25 | | 0.07 | 1.25 |
| Tetraethylenepentamine | | 0.14 | | 0.14 | | | | | | | |
| Sodium bisulfite | | | | | 0.12 | | | | | | |
| Potassium chloride | 0.5 | 0.5 | 1.0 | 0.5 | | 0.5 | | 0.5 | | | 0.7 |
| Potassium hydroxide | | | | | | | | | | | 0.092 |
| Polymerization temperature, °C | 50 | 40 | 40 | 50 | 50 | 60 | 5 | 5 | 60 | 60 | 5 |
| Polymerization time, hours | 12-24 | 12-24 | 12-24 | 12-24 | 12-24 | 12-24 | 12-15 | 8.5 | 18 | 18 | 10.75 |
| Polymerization conversion, percent | 100 | 100 | 100 | 100 | 100 | 100 | 60 | 60 | 98 | 100 | 65 |

[1] The monomer in G is butadiene; the Mooney viscosity of the polymer product was 30 ML-4.
[2] Santomerse-S3 is an alkylaryl sodium sulfonate produced by Monsanto Chemical Company.
[3] Dresinate 731 is the sodium salt of disproportionated rosin produced by Hercules Powder Company.
[4] Duponol ME is the sodium salt of dodecyl alcohol sulfate produced by E. I. du Pont de Nemours and Co., Inc.
[5] MTM is a mixed tertiary dodecyl, tetradecyl and hexadecyl mercaptan produced by Phillips Petroleum Co.

TABLE XXIX.—COMPOUNDING RECIPES FOR VULCANIZATION (PTS. PER 100 PTS. OF VULCANIZABLE MATERIAL)

| Compound No. XXIX | A | B | C | D | E | F | G | H | I | J | K | L | M |
|---|---|---|---|---|---|---|---|---|---|---|---|---|---|
| Zinc oxide | 3 | 3 | 3 | 5 | 5 | 3 | 5 | 3 | 3 | 5 | 5 | 3 | 5 |
| Magnesium oxide, calcined | | | | | | | | | | | 4 | 4 | |
| Stearic acid | 1 | 1 | 2 | 1 | 1 | 1 | 1 | 2 | 2 | 0.5 | | 2 | 3 |
| Benzothiazyldisulfide | 1 | | | 1 | 1 | | 0.5 | | | 0.5 | | | |
| Diphenylguanidine | | | | | | | | | | | 0.75 | | |
| 2-mercaptobenzothiazole | 0.5 | | | 0.5 | | | | | | | | | 1 |
| Phenyl-beta-naphthylamine | | | | | | | | | | | | | |
| Phenyl-alpha-naphthylamine | | | | | | | | | | 2 | | | |
| AgeRite Resin D [1] | | 1 | | | | | 1 | | 1 | 1 | | | |
| N-cyclohexyl-2-benzothiazolesulfenamide | | 1 | | | 1 | | | 1 | 1 | | | 1 | |
| Accelerator A-32 [2] | | | 0.2 | | | | | | | | | | |
| Tetramethylthiuramdisulfide | | | | | | | | | | 1 | | | |
| Sulfur | 2.5 | 2.5 | 2.5 | 2.5 | 2.5 | 2.5 | 5 | 1.5 | 2.5 | | 1 | 2.5 | 2.5 |

[1] Polymerized trimethyldihydroquinoline.
[2] Reaction product of butyraldehyde and butylidene aniline made by Monsanto Chemical Company.

TABLE XXX.—VINYLIC FILLERS GRAFTED WITH CONDENSATION GRAFTS

| Example No. XXX | Control | 1 | 2 | 3 |
|---|---|---|---|---|
| Elastomer latex (Dry basis): | | | | |
| GR-S 1500 | | | | |
| Quantity | 100 | 100 | 100 | 100 |
| Vinylic filler latex (Dry basis): | | | | |
| Quantity | | 23 | 23 | 23 |
| Composition: | | | | |
| Polymerization Step I (Core): | | | | |
| Styrene | | 88 | 60 | 75 |
| 2-vinylpyridine | | 2 | 30 | |
| 4-vinylpyridine | | | | 15 |
| Divinylbenzene (cross-linking agent) | | 10 | 10 | 10 |
| Polymerization recipe (Table XXVIII) | | B | B | B |
| Condensation Step II (Graft):* | | | | |
| Resorcinol | | 4 | 9 | 9 |
| Formaldehyde, aqueous 36% | | 7.7 | 17.4 | 17.4 |
| Water | | 400 | 500 | 500 |
| Ammonia, aqueous 28% | | 2.5 | 5.5 | 5.5 |
| Temperature, °C | | 49 | 80 | 80 |
| Time, hours | | 18 | 18 | 18 |
| Compound: | | | | |
| Recipe (Table XXIX) | A | I | I | I |
| Compound Mooney viscosity, ML-4 | 37 | 55 | 56 | 61 |
| Cure, minutes at 285° F | 90 | 120 | 90 | 120 |
| Test results: | | | | |
| Elongation, percent | 320 | 640 | 725 | 600 |
| Modulus, 300% | 160 | 560 | 335 | 600 |
| Hardness, Shore A Durometer | 39 | 69 | 63 | 67 |
| Tensile strength, p.s.i. | 215 | 2,660 | 2,715 | 2,565 |
| Percent increase in tensile strength | | 1,137 | 1,163 | 1,193 |

*Condensation constituents pre-mixed at room temperature and added to the Step I Latex, followed by aging for time and temperature described, before blending with the GR-S Latex and cocoagulating, the condensation product being cross-linkable at the curing temperature.

TABLE XXXI.—CHEMICAL TREATMENT OF GRAFT VINYLIC FILLERS

| Example No. XXXI | Control | 1 | 2 | 3 | 4 |
|---|---|---|---|---|---|
| Elastomer latex (Dry basis): | | | | | |
| GR-S 1500 | | | | | |
| Quantity | 100 | 100 | 100 | 100 | 100 |
| Vinylic filler latex (Dry basis): | | | | | |
| Quantity | | 20 | 20 | 20 | 20 |
| Composition: | | | | | |
| Polymerization Step I (Core): | | | | | |
| Styrene | | 80 | 80 | 80 | 70 |
| Methacrylic acid | | | | | 10 |
| Divinylbenzene* | | 9 | 9 | 9 | 9 |
| Polymerization recipe (Table XXVIII) | | A | A | A | A |
| Polymerization Step II (Graft): | | | | | |
| Isoprene | | 10 | 10 | 10 | 10 |
| Divinylbenzene* | | 1 | 1 | 1 | 1 |
| Catalyst: Diisopropylbenzene hydroperoxide | | 0.5 | 0.5 | 0.5 | 0.5 |
| Chemical treatment: | | | | | |
| Bromine | | | 28.5 | 28.5 | 28.5 |
| Ammonia, aqueous 28% | | | 20 | | |
| Water | | | 1,800 | 1,800 | 1,250 |
| Compound: | | | | | |
| Recipe (Table XXIX) | A | C | C | C | C |
| N-sub.-alpha-aminopropionitrile | | | | | 4 |
| Compound Mooney viscosity, ML-4 | 37 | 39 | 56 | 51 | 50 |
| Cure, minutes at 285° F | 90 | 60 | 75 | 75 | 120 |
| Test results: | | | | | |
| Elongation, percent | 320 | 540 | 630 | 650 | 815 |
| Modulus, 300% | 160 | 430 | 650 | 630 | 390 |
| Hardness, Shore A Durometer | 39 | 58 | 63 | 65 | 65 |
| Tensile strength, p.s.i | 215 | 1,730 | 2,490 | 2,510 | 2,735 |
| Percent increase in tensile strength | | 705 | 1,058 | 1,067 | 1,172 |

*Cross-linking agent.

TABLE XXXII.—ACIDIC VINYLIC FILLERS GRAFTED WITH UNSATURATED NON-CROSS-LINKED GRAFTS AND WITH UNSATURATED POLAR BASIC GRAFTS

| Example No. XXXII | Control | 1 | 2 | 3 | 4 | 5 | 6 | 7 | 8 |
|---|---|---|---|---|---|---|---|---|---|
| Elastomer latex (Dry basis): GR-S 1500 | 100 | 100 | 100 | 100 | 100 | 100 | 100 | 100 | 100 |
| Vinylic filler latex (Dry basis) | | 20 | 20 | 20 | 20 | 20 | 20 | 23 | 23 |
| Composition: | | | | | | | | | |
| Polymerization Step I (Core): | | | | | | | | | |
| Styrene | | 80 | 80 | 80 | 80 | 80 | 80 | 80 | 80 |
| Methacrylic acid | | 10 | 10 | 10 | 10 | 10 | 10 | 10 | 10 |
| Divinylbenzene [1] | | 10 | 10 | 10 | 10 | 10 | 10 | 10 | 10 |
| Polymerization recipe (Table XXVIII) | | A | A | A | A | A | A | A | A |
| Polymerization Step II (Graft): | | | | | | | | | |
| Butadiene | | 10 | 9 | 12.75 | 12.75 | 7.5 | 7.5 | 10 | 10 |
| 2-vinylpyridine | | | | 2.25 | | 7.5 | | | |
| 4-vinylpyridine | | | | | 2.25 | | 7.5 | | |
| Styrene | | | 3 | | | | | | |
| tert-Dodecylmercaptan | | | 0.5 | | | | | | |
| Diethylaminoethylmethacrylate | | | | | | | | 5 | |
| Hydroxypropylmethacrylate | | | | | | | | | 5 |
| Catalyst: azobis-(isobutyronitrile) | | 0.1 | 0.3 | 0.1 | 0.1 | 0.1 | 0.1 | 0.1 | 0.1 |
| Polymerization temperature, °C | | 60 | 60 | 60 | 60 | 60 | 60 | 60 | 60 |
| Polymerization time, hours | | 18 | 18 | 18 | 18 | 18 | 18 | 18 | 18 |
| Compound: | | | | | | | | | |
| Recipe (Table XXIX) | A | F | F | F | F | F | F | B | B |
| N-sub.-alpha-aminopropionitrile [2] | | 1 | 1 | 1 | 1 | 1 | 1 | 1 | 1 |
| Compound Mooney, ML-4 | 37 | 55 | 64 | 57 | 59 | 63 | 58 | 55 | 54 |
| Cure, minutes at 285° F | 90 | 120 | 90 | 60 | 45 | 60 | 30 | 60 | 45 |
| Test results: | | | | | | | | | |
| Elongation, percent | 320 | 700 | 725 | 700 | 725 | 675 | 760 | 750 | 800 |
| Modulus, 300% | 160 | 560 | 445 | 530 | 580 | 675 | 425 | 390 | 355 |
| Hardness, Shore A Durometer | 39 | 70 | 63 | 73 | 66 | 73 | 60 | 66 | 64 |
| Tensile strength, p.s.i | 215 | 3,130 | 3,000 | 3,350 | 3,300 | 3,125 | 3,000 | 3,185 | 3,310 |
| Percent increase in tensile strength | | 1,365 | 1,295 | 1,458 | 1,435 | 1,353 | 1,295 | 1,381 | 1,440 |

[1] Cross-linking agent. [2] Amitrile T-3.

TABLE XXXIII.—GRAFT VINYLIC FILLERS WITH CARBOXYLIC GRAFTS WITH VARIOUS CROSS-LINKING AGENTS

| Example No. XXXIII | Control | 1 | 2 | 3 | 4 |
|---|---|---|---|---|---|
| Elastomer latex (Dry basis): | | | | | |
| GR-S 1500 | | | | | |
| Quantity | 100 | 100 | 100 | 100 | 100 |
| Vinylic filler latex (Dry basis): | | | | | |
| Quantity | | 20 | 20 | 20 | 20 |
| Composition: | | | | | |
| Polymerization Step I (Core): | | | | | |
| Styrene | | 90 | 90 | 90 | 90 |
| Divinylbenzene * | | 10 | 10 | 10 | 10 |
| Polymerization recipe (Table XXXIII) | | 90 | 90 | 90 | 90 |
| Polymerization Step II (Graft): | | | | | |
| Methacrylic acid | | 1 | 1 | 1 | 1 |
| Divinylbenzene * | | 4 | | | |
| Ethyleneglycoldimethacrylate * | | | 4 | | |
| Allylacrylate * | | | | 4 | |
| Butadiene | | | | | 4 |
| Catalyst: | | | | | |
| Diisopropylbenzene hydroperoxide | | 0.5 | 0.5 | 0.5 | 0.5 |
| Water | | 300 | 300 | 300 | 300 |
| Polymerization temperature, °C | | 80 | 80 | 80 | 80 |
| Polymerization time, hours | | 18 | 18 | 18 | 18 |
| Compound: | | | | | |
| Recipe (Table XXIX) | A | C | C | C | C |
| N-sub.-alpha-aminopropionitrile | | 2 | 2 | 2 | 2 |
| Compound Mooney viscosity, ML-4 | 37 | 50 | 52 | 50 | 48 |
| Cure, minutes at 285° F | 90 | 60 | 30 | 20 | 60 |
| Test results: | | | | | |
| Elogation, percent | 320 | 660 | 775 | 935 | 695 |
| Modulus, 300 percent | 160 | 455 | 375 | 285 | 460 |
| Hardness, Shore A Durometer | 39 | 64 | 63 | 56 | 68 |
| Tensile strength, p.s.i | 215 | 2,710 | 2,510 | 2,800 | 2,890 |
| Percent increase in tensile strength | | 1,160 | 1,067 | 1,202 | 1,244 |

*Cross-linking agent.

TABLE XXXIV.—VINYLIC FILLERS WITH PLURALITY OF GRAFTS—ACIDIC VINYLIC FILLER GRAFTED WITH VINYLPYRIDINE GRAFT AND CONDENSATION GRAFT AND COMPARISON

| Examples No. XXXIV | Control | 1 | 2 | 3 | 4 | 5 | 6 | 7 | 8 | 9 | 10 | 11 | 12 |
|---|---|---|---|---|---|---|---|---|---|---|---|---|---|
| Elastomer latex (Dry basis): | | | | | | | | | | | | | |
| GR-S 1500 | | | | | | | | | | | | | |
| Quantity | 100 | 100 | 100 | 100 | 100 | 100 | 100 | 100 | 100 | 100 | 100 | 100 | 100 |
| Vinylic filler latex (Dry basis): | | | | | | | | | | | | | |
| Quantity | | 23.0 | 23.4 | 24.4 | 23.0 | 23.3 | 24.4 | 23.0 | 23.3 | 24.4 | 26.0 | 27.0 | 28.6 |
| Composition: | | | | | | | | | | | | | |
| Polymerization Step I (Core): | | | | | | | | | | | | | |
| Styrene | | 80 | 80 | 80 | 80 | 80 | 80 | 80 | 80 | 80 | 80 | 80 | 80 |
| Methacrylic acid | | 10 | 10 | 10 | 10 | 10 | 10 | 10 | 10 | 10 | 10 | 10 | 10 |
| Divinylbenzene (cross-linking agent) | | 10 | 10 | 10 | 10 | 10 | 10 | 10 | 10 | 10 | 10 | 10 | 10 |
| Polymerization recipe (Table XXVIII) | | A | A | A | A | A | A | A | A | A | A | A | A |
| Polymerization Step II (Graft):[1] | | | | | | | | | | | | | |
| Butadiene | | 12.75 | 12.75 | 12.75 | 12.75 | 12.75 | 12.75 | 7.5 | 7.5 | 7.5 | 15.0 | 15 | 15 |
| 2-vinylpyridine | | 2.25 | 2.25 | 2.25 | | | | | | | | | |
| 4-vinylpyridine | | | | | 2.25 | 2.25 | 2.25 | 7.5 | 7.5 | 7.5 | 15.0 | 15 | 15 |
| Catalyst: Azobis-(isobutyronitrile) | | 0.1 | 0.1 | 0.1 | 0.1 | 0.1 | 0.1 | 0.1 | 0.1 | 0.1 | 0.1 | 0.1 | 0.1 |
| Polymerization temperature, °C | | 60 | 60 | 60 | 60 | 60 | 60 | 60 | 60 | 60 | 60 | 60 | 60 |
| Polymerization time, hours | | 18 | 18 | 18 | 18 | 18 | 18 | 18 | 18 | 18 | 18 | 18 | 18 |
| Condensation Step III (Graft):[2] | | 1.5 | 4.5 | | 1.5 | 4.5 | | 1.5 | 4.5 | | 3 | 9 | |
| Resorcinol | | 1.5 | 4.5 | | 1.5 | 4.5 | | 1.5 | 4.5 | | 3 | 9 | |
| Formaldehyde, aqueous 36% | | 2.9 | 8.7 | | 2.9 | 8.7 | | 2.9 | 8.7 | | 5.8 | 17.4 | |
| Ammonia, aqueous 28% | | 0.9 | 2.8 | | 0.9 | 2.8 | | 0.9 | 2.8 | | 1.8 | 5.5 | |
| Water | | 500 | 500 | | 500 | 500 | | 500 | 500 | | 500 | 500 | |
| Condensation temperature, °C | | 70 | 70 | | 70 | 70 | | 70 | 70 | | 70 | 70 | |
| Condensation time, hours | | 18 | 18 | | 18 | 18 | | 18 | 18 | | 18 | 18 | |
| Compound: | | | | | | | | | | | | | |
| Recipe (Table XXIX) | A | I | I | I | I | I | I | I | I | I | I | I | I |
| N-sub.-alpha-aminopropionitrile | | 1 | 1 | 1 | 1 | 1 | 1 | 1 | 1 | 1 | 1 | 1 | 1 |
| Compound Mooney viscosity, ML-4 | 37 | 57 | 57 | 67 | 59 | 70 | 59 | 63 | 61 | 60 | 68 | 61 | 66 |
| Cure, minutes at 285° F | 90 | 60 | 90 | 120 | 45 | 105 | 120 | 60 | 105 | 120 | 90 | 105 | 120 |
| Test results: | | | | | | | | | | | | | |
| Elongation, percent | 320 | 700 | 660 | 650 | 725 | 625 | 635 | 675 | 620 | 650 | 650 | 650 | 650 |
| Modulus, 300% | 160 | 530 | 450 | 700 | 580 | 900 | 650 | 675 | 625 | 650 | 650 | 590 | 835 |
| Hardness, Shore A Durometer | 39 | 73 | 74 | 81 | 66 | 79 | 78 | 73 | 73 | 80 | 73 | 76 | 81 |
| Tensile strength, p.s.i | 215 | 3,350 | 3,100 | 3,390 | 3,300 | 3,410 | 3,225 | 3,125 | 3,125 | 3,100 | 2,925 | 3,235 | 3,525 |
| Percent increase in tensile strength | | 1,458 | 1,342 | 1,477 | 1,435 | 1,486 | 1,400 | 1,353 | 1,353 | 1,342 | 1,260 | 1,405 | 1,540 |

[1] Cross-linking agent. [2] See footnote Table XXX.

TABLE XXXV.—GRAFTED DIENE POLYMERS REINFORCED WITH GRAFT VINYLIC FILLERS

| Example No. XXXV | Control | 1 | 2 |
|---|---|---|---|
| Grafted elastomer: | | | |
| G R-S 1500 latex (Dry basis)[1] | 100 | 100 | 100 |
| Methylmethacrylate | 20 | 20 | 20 |
| Tetraethylene pentamine | 0.4 | 0.4 | 0.4 |
| Water | 20 | 20 | 20 |
| Cumene hydroperoxide | 0.4 | 0.4 | 0.4 |
| Polymerization temperature, °C | 5 | 5 | 5 |
| Polymerization time, hours | 4 | 4 | 4 |
| Polymerization conversion, percent | 100 | 100 | 100 |
| Shortstopped with chlorodinitrobenzene | 0.3 | 0.3 | 0.3 |
| Antioxidant, phenyl-beta-naphthylamine | 1.25 | 1.25 | 1.25 |
| Vinylic filler latex (Dry basis): | | | |
| Quantity | | 24 | 24 |
| Composition: | | | |
| Polymerization Step I: | | | |
| Styrene | | 80 | 90 |
| Methacrylic acid | | 10 | |
| Divinylbenzene[2] | | 10 | 10 |
| Polymerization recipe (Table XXVIII) | | A | A |
| Polymerization Step II (Graft): | | | |
| Methylmethacrylate | | | 15 |
| Tetraethylene pentamine | | | 0.5 |
| Cumene hydroperoxide | | | 0.5 |
| Polymerization temperature, °C | | | 60 |
| Polymerization time, hours | | | 18 |
| Polymerization conversion, percent | | | 100 |
| Compound: | | | |
| Recipe (Table XXIX) | (3) | (4) | (4) |
| N-sub.-alpha-aminopropionitrile | | 1 | |
| Compound Mooney viscosity, ML-4 | 88 | 200 | 200 |
| Cure, minutes at 285° F | 30 | 75 | 105 |
| Test results: | | | |
| Elongation, percent | 410 | 350 | 610 |
| Modulus, 300% | 825 | 3,235 | 965 |
| Hardness, Shore A Durometer | 50 | 79 | 81 |
| Tensile strength, p.s.i | 1,310 | 3,570 | 2,625 |
| Percent increase in tensile strength | | 172 | 100 |

[1] Antioxidant free.
[2] Cross-linking agent.
[3] Compounding recipe: 1.75 benzothiazyldisulfide; 5 zinc oxide; 1.5 sulfur.
[4] Compounding recipe: 1 stearic acid; 1 AgeRite Resin D; 1.75 benzothiazyldisulfide; 5 zinc oxide; 1.5 sulfur.

TABLE XXXVII.—GRAFT VINYLIC FILLER REINFORCEMENT OF BUTYL RUBBER

| Example No. XXXVII | Control | 1 | 2 |
|---|---|---|---|
| Elastomer (Dry basis): | | | |
| Butyl rubber type | | | |
| Quantity | 100 | 100 | 100 |
| Vinylic filler latex (Dry basis): | | | |
| Quantity | | 20 | 20 |
| Composition: | | | |
| Polymerization Step I (Core): | | | |
| Styrene | | 90 | 80 |
| Methacrylic acid | | | 10 |
| Divinylbenzene* | | 10 | 10 |
| Polymerization recipe (Table XXXVII) | | A | A |
| Polymerization Step II (Graft): | | | |
| Butadiene | | | 12.75 |
| Isoprene | | 100 | |
| tertiary Dodecyl mercaptan | | 0.2 | |
| 4-vinylpyridine | | | 2.25 |
| Catalyst: | | | |
| Azobis-(isobutyronitrile) | | | |
| Water | | 100 | |
| Polymerization temperature, °C | | 60 | 60 |
| Polymerization time, hours | | 18 | 18 |
| Condensation Step III (Graft): | | | |
| Resorcinol | | | 9 |
| Formaldehyde, aqueous 36% | | | 17.4 |
| Ammonia, aqueous 28% | | | 5.5 |
| Water | | | 800 |
| Condensation temperature, °C | | | 80 |
| Condensation time, hours | | | 18 |
| Compound: | | | |
| Recipe (Table XXIX) | G | G | G |
| N-sub.-alpha-aminopropionitrile | | | 1.5 |
| Compound Mooney viscosity, ML-4 | 75 | 59 | 84 |
| Cure, minutes at 285° F | 45 | 90 | 150 |
| Test results: | | | |
| Elongation, Percent | 640 | 825 | 900 |
| Modulus, 300% | 155 | 335 | 225 |
| Hardness, Shore A Durometer | 40 | 50 | 64 |
| Tensile strength, p.s.i | 435 | 1,300 | 2,265 |
| Percent increase in tensile strength | | 299 | 521 |

*Cross-linking agent.

TABLE XXXVI.—NATURAL RUBBER AND THE LIKE REINFORCED WITH GRAFT VINYLIC FILLERS

| Example No. XXXVI | Control 1 | Control 2 | 1 | 2 | 3 | 4 |
|---|---|---|---|---|---|---|
| Natural rubber latex (Dry basis) | 100 | 100 | 100 | 100 | 100 | |
| Polyisoprene, Coral rubber [1] | | | | | | 100 |
| Vinylic filler latex (Dry basis) | | 20 | 24 | 23.5 | 20 | 15 |
| Composition: | | | | | | |
| Polymerization Step I (Recipe, Table XXVIII) | | A | A | A | (2) | (2) |
| Styrene | | 80 | 80 | 80 | 5 | 5 |
| Divinylbenzene [3] | | 10 | 10 | 10 | | |
| Methacrolein | | 10 | 10 | 10 | | |
| Maleic anhydride | | | | | 5 | 5 |
| Polymerization Step II (Recipe, Table XXVIII) | | | | | 4A | 4A |
| Styrene | | | | | 95 | 95 |
| Divinylbenzene [3] | | | | | 5 | 5 |
| Casein (dispersed in aqueous NaOH) | | | | 20 | | |
| Aniline | | | | 2.67 | | |
| Formaldehyde (40% solution) | | | | 2.2 | | |
| Polymerization temp., °C | | | | | 80 | 60 | 60 |
| Polymerization time, hours | | | | | 18 | 18 | 18 |
| Compound: | | | | | | |
| Recipe (Table XXIX) | M | M | M | M | M | M |
| N-sub-alpha-aminopropionitrile, Amitrile T-3 [5] | | 1 | 1 | 1 | 1 | 1 |
| Compound Mooney viscosity, ML-4 | 31 | 16 | 17 | 25 | 12 | |
| Cure, minutes at 285° F | 60 | 30 | 20 | 30 | 20 | 30 |
| Test results: | | | | | | |
| Elongation, percent | 820 | 725 | 730 | 725 | 765 | 650 |
| 300% modulus, p.s.i | 200 | 575 | 600 | 530 | 490 | 740 |
| Hardness, Shore A Durometer | 37 | 68 | 71 | 63 | 63 | 69 |
| Tensile, p.s.i | 3,100 | 4,645 | 4,645 | 4,115 | 4,835 | 3,350 |
| Percent increase in tensile strength | | 50 | 50 | 33 | 56 | 8 |

[1] Coral rubber is a synthetic polyisoprene produced by lithium metal mass catalysis by Firestone Tire and Rubber Company.
[2] Polymerized in benzene solution with 1% benzoylperoxide catalyst for 8 hrs.; then benzene removed and copolymer used as polymeric emulsifier in Step II.
[3] Cross-linking agent.
[4] The 10 pts. Santomerse-3 was omitted from Recipe A and was replaced with 0.3 pt. Duponol ME in 500 pts. water and 2 pts. ammonia.
[5] Amitriles available from Vurke Research Company, Van Dyke, Michigan.

TABLE XXXVIII.—POLYVINYL CHLORIDE REINFORCED WITH VINYLIC FILLERS

| Example No. XXXVIII | Control | 1 | 2 | 3 | 4 |
|---|---|---|---|---|---|
| Plastomer latex (Dry basis): | | | | | |
| Polyvinyl chloride (404-III) | | | | 100 | 100 |
| Polyvinyl chloride latex plasticized: Type Geon 576 (total solids 55.6%) [1] | 100 | 100 | 100 | | |
| Plasticizer (Hycar 1562) | | | | 60 | 60 |
| Plasticizer—Dioctyl phthalate | | | | 14 | 14 |
| Plasticizer—Tricresyl phosphate | | | | 8 | 8 |
| Vinylic filler latex (Dry basis): | | | | | |
| Quantity | | 20 | 27 | | 20 |
| Composition: | | | | | |
| Polymerization Step I (Core): | | | | | |
| Styrene | | 80 | 80 | | 5 |
| Methacrylic acid | | 10 | 10 | | |
| Divinylbenzene [2] | | 10 | 10 | | |
| Maleic anhydride [3] | | | | | 5 |
| Polymerization Recipe (Table XXVIII) | | A | A | | |
| Polymerization Step II (Graft): | | | | | |
| Butadiene | | | 12.75 | | |
| 4-vinylpyridine | | | 2.25 | | |
| Vinyltoluene | | | | | [4] 90 |
| Divinylbenzene | | | | | [4] 10 |
| Catalyst: Azobis-(isobutyronitrile) | | | 0.1 | | |
| Polymerization temperature, °C | | | 60 | | |
| Polymerization time, hours | | | 18 | | |
| Condensation Step III (Graft): | | | | | |
| Resorcinol | | | 9 | | |
| Formaldehyde, aqueous 36% | | | 17.4 | | |
| Ammonia, aqueous 28% | | | 5.5 | | |
| Water | | | 800 | | |
| Condensation temperature, °C | | | 80 | | |
| Condensation time, hours | | | 18 | | |
| Test results: | | | | | |
| Elongation, percent | 225 | 200 | 185 | 240 | 180 |
| Tensile strength, p.s.i | 2,375 | 3,385 | 3,790 | 865 | 1,650 |
| Percent increase in tensile strength | | 43 | 60 | | 91 |

[1] A product of the B.F. Goodrich Chemical Company. B.M.G. Zwicker, Ind. Eng. Chem., 44, 774 (1952).
[2] Cross-linking agent.
[3] The styrene-maleic anhydride copolymer was polymerized in benzene solution at 60°C. with benzoyl peroxide catalyst.
[4] Polymerization Recipe E Table XXVIII was used for Step II in Example 3.

TABLE XXXIX.—PLASTOMERS REINFORCED WITH GRAFT VINYLIC FILLERS

| Example No. XXXIX | PVVC Control | 1 | PVB Control | 2 |
|---|---|---|---|---|
| Plastomer latex (Dry basis): | | | | |
| Polyvinyl chloride—vinylidene chloride [1] | 80 | 80 | | |
| Polyvinylbutyrol [2] | | | 100 | 100 |
| Plasticizer dioctyl phthalate | 20 | 20 | | |
| Vinylic filler latex (Dry basis): | | | | |
| Quantity | | 20 | | 20 |
| Composition: | | | | |
| Polymerization Step I (Core): | | | | |
| Styrene | | 80 | | 80 |
| Divinylbenzene [3] | | 10 | | 10 |
| Polymerization recipe (Table XXVIII) | | A | | A |
| Polymerization Step II (Graft): | | | | |
| Methylmethacrylate | | 35 | | 35 |
| Ethyleneglycoldimethacrylate [3] | | 15 | | 15 |
| Catalyst: Azobis-(isobutyronitrile) | | 1 | | 1 |
| Water | | 150 | | 150 |
| Polymerization temperature, °C | | 60 | | 60 |
| Polymerization time, hours | | 18 | | 18 |
| Test results: | | | | |
| Elongation, percent | 200 | 150 | 565 | 400 |
| Tensile strength, p.s.i | 1,220 | 3,100 | 585 | 1,000 |
| Percent increase in tensile strength | | 154 | | 71 |

[1] Dow Chemical Company's #774B Copolymer Latex.
[2] Monsanto Chemical Company's Merlon BRS Latex.
[3] Cross-linking agent.

TABLE XL.—POLYETHYLENE REINFORCED WITH VINYLIC FILLERS

| Example No. XL | Control | 1 | 2 | 3 |
|---|---|---|---|---|
| Plastomer: Polyethylene [1] | 100 | 100 | 100 | 100 |
| Vinylic filler latex (Dry basis): | | | | |
| Quantity | | 20 | 20 | 20 |
| Composition: | | | | |
| Polymerization Step I (Core): | | | | |
| Styrene | | 80 | 80 | 80 |
| Methacrylic acid | | 10 | 10 | 10 |
| Divinylbenzene [2] | | 10 | 10 | 10 |
| Polymerization Recipe (Table XXVIII) | | A | A | A |
| Polymerization Step II (Graft): | | | | |
| Butadiene | | 12.75 | 12.75 | |
| 4-vinylpyridine | | 2.25 | 2.25 | |
| Catalyst: Azobis-(isobutyronitrile) | | 0.1 | 0.1 | |
| Water | | 100 | 100 | |
| Polymerization temperature, °C | | 60 | 60 | |
| Polymerization time, hours | | 18 | 18 | |
| Condensation Step III (Graft): [2] | | | | |
| Resorcinol | | | | 4.5 |
| Formaldehyde, aqueous 36% | | | | 8.4 |
| Ammonia, aqueous 28% | | | | 2.75 |
| Water | | | | 200 |
| Condensation temperature, °C | | | | 80 |
| Condensation time, hours | | | | 16 |
| Test results: | | | | |
| Elongation, percent | 35 | 40 | 50 | 40 |
| Tensile strength, p.s.i | 1,175 | 1,650 | 1,785 | 2,000 |
| Percent increase in tensile strength | | 40 | 52 | 70 |

[1] The polyethylene used was Bakelite Polyethylene DYNH, a product of the Bakelite Company, Division of Union Carbide and Carbon Corporation.
[2] Cross-linking agent.

TABLE XLI.—VINYLIC FILLER-VINYL DIENE PLASTOMER RESIN COMPOSITIONS AND VINYLIC FILLER DISPERSANT COMBINATIONS

| Example No. XLI | Control | 1 | 2 | 3 | 4 | 5 | 6 | 7 | 8 |
|---|---|---|---|---|---|---|---|---|---|
| Elastomer latex (Dry basis): GR-S 1500 | 100 | 100 | 100 | 100 | 100 | 100 | 100 | 100 | 100 |
| Vinylic filler plus dispersant (Quantity, dry basis) | | 26 | 20 | 26 | 20 | 40 | | 40 | 26 |
| Vinylic filler latex (Quantity, dry basis) | | 20 | 20 | 20 | 20 | 20 | | 20 | 20 |
| Composition: | | | | | | | | | |
| Styrene | | 80 | 80 | 80 | 80 | 80 | | 90 | 90 |
| Methacrylic acid | | 10 | 10 | 10 | 10 | 10 | | | |
| Styrene-maleic anhydride copolymer | | | | | | | | 10 | 10 |
| Divinylbenzene (cross-linking agent) | | 10 | 10 | 10 | 10 | 10 | | 10 | 10 |
| Polymerization recipe (Table XXVIII) | | A | A | A | A | A | | [1]A | [1]A |
| Dispersants added to vinylic filler latex before drying: | | | | | | | | | |
| Ricinoleic acid | | | | | 3 | | | | 3 |
| Tallow amine, Armeen T [2] | | | | | | 3 | | | 3 |
| Amine, Priminox 32 [3] | | | 6 | | | | | | |
| Plastomer latex (Quantity, dry basis) [3] | | | | | 20 | 20 | 20 | 20 | |
| Air dried to 70° C | | X | X | X | X | X | | | X |
| Plastomer latex, Composition: | | | | | | | | | |
| Styrene | | | | | 77 | 85 | 85 | 85 | |
| Butadiene | | | | | 15 | 15 | 15 | 15 | |
| Methacrylic acid | | | | | 8 | | | | |
| Styrene-maleic anhydride copolymer | | | | | | | 10 | 10 | |
| Polymerization recipe (Table XXVIII) | | | | | F | F | F | F | |
| Method of combining vinylic filler with elastomer: | | | | | | | | | |
| Vinylic filler and dispersant-dried and milled into elastomer | | X | X | X | X | X | | | X |
| Latices cocoagulated | | | | | | | X | X | |
| Compound: | | | | | | | | | |
| Recipe (Table XXIX) | A | L | I | B | B | B | B | B | B |
| Amine: | | | | | | | | | |
| Priminox 32 (Rohm and Haas Co.) | | | 5 | | | | | | |
| 28% aqueous ammonia | 2.5 | | 5 | | | | | | |
| N-sub-alpha-aminopropionitrile: | | | | | | | | | |
| Type TEPA | | | | 0.5 | | | | | |
| Type A-1 | | | | | 1.8 | 1.4 | | | |
| Type T-3 | | | | | | | 1 | 2 | 1 |
| Compound Mooney viscosity, ML-4 | 37 | | 52 | 46 | 49 | 64 | 45 | 58 | |
| Cure, minutes at 285° F | 90 | 60 | 30 | 20 | 30 | 45 | 45 | 60 | 20 |
| Test results: | | | | | | | | | |
| Elongation, percent | 320 | 650 | 700 | 750 | 725 | 660 | 550 | 665 | 700 |
| Modulus, 300%, p.s.i | 160 | 270 | 325 | 270 | 440 | 590 | 655 | 970 | 510 |
| Hardness, Shore A Durometer | 39 | 66 | 64 | 63 | 63 | 82 | 66 | 79 | 59 |
| Tensile, p.s.i | 215 | 2,200 | 2,200 | 2,465 | 2,520 | 2,455 | 1,680 | 2,700 | 3,350 |
| Percent increase in tensile strength | | 923 | 923 | 1,047 | 1,072 | 1,042 | 681 | 1,156 | 1,459 |

[1] Polymerization Formula A was modified by substituting 500 parts water containing 2 parts ammonia and 0.3 part of Duponol ME for 10 parts Santomerse-3.
[2] Armeen T is a tallow amine produced by Armour & Co., Inc.
[3] Priminox 32 is an amine of the structure R—NH(CH$_2$O)$_{25}$H, where R is mixed alkyl of 18-24 carbon atoms produced by Rohm and Haas Co.

TABLE XLII.—VINYLIC FILLER-CARBOHYDRATE COMBINATIONS

| Example No. XLII | 1 | 2 | 3 | 4 | 5 | 6 |
|---|---|---|---|---|---|---|
| Vinylic filler latex: | | | | | | |
| Methacrolein | | | 10 | | | |
| Acrolein | 10 | | 10 | | | |
| Styrene | 70 | | 70 | 70 | 80 | 80 |
| Methylmethacrylate | | 100 | | | | |
| Triacrylylhexahydrotriazine [1] | | 10 | | | | |
| Divinylbenzene (50%) [1] | 20 | | 20 | 20 | 20 | 20 |
| Water | 300 | 300 | 300 | 300 | 600 | 600 |
| Fatty alcohol sodium sulfate (Duponol ME) | | | | | 0.3 | 0.3 |
| Alkylaryl sodium sulfonate [2] | 10 | 10 | 10 | 10 | | |
| Styrene-maleic anhydride copolymer [3] | | | | | 10 | 10 |
| Tertiary dodecyl mercaptan [4] | | 0.1 | 0.1 | | | |
| Diisopropylbenzene hydroperoxide | 1.25 | 2 | 1.25 | 1.25 | | |
| Potassium pyrophosphate | 0.21 | | 0.21 | 0.21 | | |
| Ferrous sulfate | 0.19 | | 0.19 | 0.19 | | |
| Aqueous ammonia (28%) | | | | | 7.2 | 7.2 |
| Ammonium persulfate | | | | | 1.0 | 1.0 |
| Sodium sulfite | | | | | 0.5 | 0.5 |
| Polymerization temperature, ° C | 70 | 70 | 70 | 70 | 60 | 60 |
| Polymerization time, hours | 12 | 12 | 12 | 12 | 18 | 18 |
| Polymerization conversion, percent total solids | 26 | 26.5 | 26 | 26 | 14.3 | 14.3 |
| Carbohydrate cook: | | | | | | |
| Polyose M-214 [5] | | 150 | | | | |
| White Dextrin No. 7002 [5] | | | 110 | | | |
| Hydroxyethyl starch #6781 [6] | | | | 80 | | |
| Oxidized starch #5591 [7] | | | | 40 | 40 | 40 |
| Water | | 260 | | 125 | 125 | 125 |
| Protein solution [8] | 265 | | 265 | | | |
| Urea | | | | 10 | 10 | 10 |
| Cooked at 100° C., minutes | 12 | 15 | 15 | 15 | 15 | 15 |
| Formulation: | | | | | | |
| Vinylic filler latex | 150 | 100 | 100 | 100 | 100 | 100 |
| Carbohydrate cook | 415 | | 345 | 175 | 175 | 175 |
| Butadiene-acrylonitrile copolymer (Hycar 1561) [9] | | | | | | 25 |
| Glycerine | 3 | 5 | 8 | | | |
| Glucamine (72%) | | | | | 5 | 5 |
| Mixing time, minutes | 3 | 3 | 5 | 3 | 5 | 5 |

[1] Cross-linking agent.
[2] Monsanto Chemical Company.
[3] Styrene-maleic anhydride copolymer prepared by polymerizing styrene 46.5 pts.; maleic anhydride 53.3 pts.; benzene 500 pts.; benzoyl peroxide 1.5 pts.; refluxed 8 hrs.
[4] "Sulfole" Phillips Petroleum Company.
[5] Corn Products Refining Company.
[6] Ten-O-Film Brand.
[7] Hercules Powder Company.
[8] Sheffield Ammonium Caseinate 10 pts., 28% aqueous ammonia 5 pts., water 250 pts. (swollen for 12 hours).
[9] B. F. Goodrich Company Hycar 1561 small particle size latex, acrylonitrile content 40%, T.S.=38.0%.

By the elaborate research summarization herein, it has been shown:

(a) That by producing in colloidal-sized particles an insoluble vinyl polymer, there is provided a new material having unpredictable advantages as a filler for elastic and plastic materials.

(b) That when such vinylic filler, and especially therein the lower sizes of the colloidal particle range, is dispersed in low gum tensile synthetic elastomers, such as the GR–S types and the butadiene-polar vinyl, e.g., acrylonitrile types of elastomers, the tensile strengths of these gum stocks and of the vulcanized products therefrom and their resistance to abrasion are improved, the tensile strength being greatly improved when the vinylic fillers are polar, and even more improved when the vinylic fillers contain reactive polar groups.

(c) That not only are the results just mentioned obtained, but that with certain combinations of the elastomers and vinylic fillers, such results are obtained with low hysteresis as compared to the results obtained with conventional filler materials.

(d) That, unpredictably, the filler materials also exhibited a reinforcing effect in synthetic elastomers of the partial self-reinforcing type, such as chloroprene, that have gum tensiles greater than the butadiene-copolymer elastomers.

(e) That unpredictably, the filler materials also exhibited a reinforcing effect in the distinctly different self-reinforcing natural rubbers of high gum tensile strength, and that in certain cases such reinforcement is accomplished while maintaining a low hysteresis as compared to that imparted to natural rubbers by conventional filler materials.

(f) That unpredictably, the vinylic fillers in combination with plastomers, which usually themselves have high tensile strengths, augment the tensile strengths thereof and in certain cases effect these results while clarifying, leaving unmodified, or providing controlled modification of the opacity of the plastomer product.

(g) That the present discovery has provided a new vinylic filler material and new vinylic filler latices; improved masterbatches; improved vulcanizable materials; and improved reinforced vulcanized and non-vulcanized products; as well as new methods of producing the same.

(h) Further in connection with points (b) through (e) just stated, the research has shown that the nature of elastomer and the nature of vinylic filler combined in a vinylic filler reinforced elastomer are interrelated, viz:

(1) That when the elastomer is one that does not crystallize substantially or stretching i.e. is of the so-called non-self-reinforcing types, examples of which are the dien homo- and copolymers such as polybutadiene, GR–S, and GR–A—the nature of vinylic filler is of great importance in determining the tensile strength of the combination, the non-polar vinylic fillers while active, only moderately increasing the tensile strength, the polar vinylic fillers as a class producing a substantially greater increase, and the polar vinylic fillers containing reactive groups capable of taking part in a sulfur vulcanization, e.g. groups from the class consisting of carboxyl and carbonyl groups and the amines (herein called reactive polar vinylic fillers) yielding tensiles far superior to the others.

(2) That when the elastomer, on the other hand, is one that does crystallize substantially on stretching—i.e. is of the so-called self-reinforcing type, examples of which are natural rubbers, polychloroprenes and butyl rubbers—the nature of the vinylic filler is of much less importance in determining the tensile strength of the reinforced elastomers at ordinary temperatures, although the polar and reactive polar vinylic fillers do seem to give better elastomer reinforcement in that order and are preferred.

(3) While applicant is not to be considered as bound by any particular theory as to reasons for these observed differences, one hypothesis that may afford a reasonable explanation of them is that the polar vinylic fillers, and especially the reactive polar ones, can take part in, or influence, or locally augment the vulcanization of the elastomer, and hence cannot only provide rigid colloidal sized particles to serve the function of a filler, but can also provide more effective local fixation of the elastomer molecules to the vinylic particles, thus serving the functions performed by the crystallites and crystallite-attachments in the self-reinforcing elastomers.

(i) Further in connection with point (f) stated just above, the research has shown that, contrary to the reduction of tensile strength usually accompanying the addition of fillers to plastomer (see King and Wentworth, "Raw Materials for Electric Cables" 1954, Ernest Been, Ltd., London, England, page 169) the vinylic fillers of the present invention augment the tensile strengths of such plastomers, the polar and active polar vinylic fillers being especially effective in this respect.

Where reference is made to a dry product in the appended claims this term is used to indicate that the natural of synthetic polymeric materials are no longer in the form of a latex and the term does not exclude the presences of moisture in the materials.

The term "vinylidene" in a broad sense, includes "vinyl," as is pointed out by the British patent to U.S. Rubber Co., No. 639,185 and where used in the following claims, is to be so construed.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A vinylic filler consisting of polymer particles,
   (a) said polymer particles being in the colloidal size range of about 4 millimicrons to about 0.5 micron average diameter.
   (b) said polymer particles being three dimensionally cross-linked so that each particle is non-soluble in any solvent that does not break down its primary chain structure,
   (c) said polymer particles having been prepared by cross-linking polymerization, in aqueous dispersion, of monomer material polymerizable therein and selected from the class consisting of the polymerizable monomers containing at least one carbon-to-carbon unsaturated group in nonconjugated arrangement with the further limitation that the selected monomer material comprises cross-linking monomer material containing a plurality of such carbon-to-carbon unsaturated groups in non-conjugated arrangement in at least a sufficient amount to effect, in said cross-linking polymerization, enough cross-linking within the particles to render them non-soluble as aforesaid;

said vinylic filler being particularly characterized in that (d) said polymer particles contain residual carbon-to-carbon unsaturated groups,
   (e) said polymer particles have an iodine number greater than one, and
   (f) said polymer particles are essentially free of attached color components.

2. A vinylic filler as defined in claim 1,
   (g) said polymer particles comprising cross-linked polymer containing amine groups chemically bound to said polymer.

3. A vinylic filler as defined in claim 1,
(g) said polymer particles comprising cross-linked polymer containing aldehyde groups chemically bound to said polymer.

4. A vinylic filler as defined in claim 1,
(g) said polymer particles having been modified by the chemical combination thereof into a condensation product selected from the class consisting of the phenol-aldehyde and amino-aldehyde condensation products.

5. A vinylic filler as defined in claim 1,
(g) said polymer particles having been modified by the chemical reaction of at least a part of the residual unsaturation thereof with material selected from the class consisting of the non-metallic elements of Groups VI–A and VII–A of the periodic table.

6. A vinylic filler as defined in claim 1,
(g) said polymer particles in aqueous dispersion having been modified by emulsion graft polymerization thereto of monomer material selected from the class consisting of the monomers having but one carbon-to-carbon unsaturated group, the monomers having a plurality of carbon-to-carbon unsaturated groups but only in non-conjugated relation, and combinations of such monomers.

7. A vinylic filler as defined in claim 1,
(g) said polymer particles in aqueous dispersion having been modified by emulsion graft polymerization thereto of carboxyl group containing monomer material selected from the class consisting of such monomers having but one carbon-to-carbon unsaturated group, such monomers having a plurality of carbon-to-carbon unsaturated groups but only in non-conjugated relation, and combinations of such monomers.

8. A vinylic filler as defined in claim 1,
(g) said polymer particles in aqueous dispersion having been modified by emulsion graft polymerization thereto of amine group containing monomer material selected from the class consisting of such monomers having but one carbon-to-carbon unsaturated group, such monomers having a plurality of carbon-to-carbon unsaturated groups but only in non-conjugated relation, and combinations of such monomers.

9. A vinylic filler as defined in claim 1,
(g) said polymer particles in aqueous dispersion having been modified by emulsion graft polymerization thereto of aldehyde group containing monomer material selected from the class consisting of such monomers having but one carbon-to-carbon unsaturated group, such monomers having a plurality of carbon-to-carbon unsaturated groups but only in non-conjugated relation, and combinations of such monomers.

10. A vinylic filler as defined in claim 1,
(g) said polymer particles in aqueous dispersion having been modified by emulsion graft polymerization thereto of monomer material selected from the class consisting of the monomers having but one carbon-to-carbon unsaturated group, the monomers having a plurality of carbon-to-carbon unsaturated groups but only in non-conjugated relation, and combinations of such monomers, and
(h) said polymer particles having been further modified by the chemical combination thereof into a condensation product selected from the class consisting of the phenol-aldehyde and amino-aldehyde condensation products.

11. A composition comprising polymer material with vinylic filler material dispersed therein, said vinylic filler being as defined in claim 1, and said polymer material being selected from the class consisting of rubbers, plastomers and combinations thereof.

12. A composition as defined in claim 11, said polymer material being a plastomer.

13. A composition as defined in claim 11, said polymer material comprising a combination of rubber and plastomer.

14. A vinylic filler consisting of polymer particles,
(a) said polymer particles being in the colloidal size range of about 5 millimicrons to about 0.5 micron average diameter,
(b) said polymer particles being three dimensionally cross-linked so that each particle is non-soluble in any solvent that does not break down its primary chain structure,
(c) said polymer particles having been prepared by cross-linking polymerization, in aqueous dispersion, of monomer material polymerizable therein and selected from the class consisting of the polymerizable monomers containing at least one carbon-to-carbon unsaturated group in non-conjugated arrangement with the further limitation that the selected monomer material comprises cross-linking monomer material containing a plurality of such carbon-to-carbon unsaturated groups in non-conjugated arrangement in at least a sufficient amount to effect, in said cross-linking polymerization, enough cross-linking within the particles to render them non-soluble as aforesaid;
said vinylic filler being particularly characterized in that
(d) in clause (c) the selected monomer material comprises vinylidene monomer material having groups selected from the class consisting of aldehyde and amine groups, and combinations of these groups, and
(e) said polymer particles are essentially free of attached color components.

15. A vinylic filler consisting of polymer particles,
(a) said polymer particles being in the colloidal size range of about 5 millimicrons to about 0.5 micron average diameter,
(b) said polymer particles being three dimensionally cross-linked so that each particle is non-soluble in any solvent that does not break down its primary chain structure,
(c) said polymer particles having been prepared by cross-linking polymerization, in aqueous dispersion, of monomer material polymerizable therein and selected from the class consisting of the polymerizable monomers containing at least one carbon-to-carbon unsaturated group in non-conjugated arrangement with the further limitation that the selected monomer material comprises cross-linking monomer material containing a plurality of such carbon-to-carbon unsaturated groups in non-conjugated arrangement in at least a sufficient amount to effect, in said cross-linking polymerization, enough cross-linking within the particles to render them non-soluble as aforesaid;
said vinylic filler being particularly characterized in that
(d) said polymer particles are essentially free of attached color components, and
(e) said polymer particles have been modified by the formation on their surfaces of a condensation product selected from the class consisting of the phenol-aldehyde and amino-aldehyde condensation products.

16. A composition comprising polymer material with vinylic filler material dispersed therein, said vinylic filler material being as defined in claim 15, and said polymer material being selected from the class consisting of rubbers, plastomers and combinations thereof.

17. A composition comprising polymer material with vinylic filler material dispersed therein, said vinylic filler material being as defined in claim 6, and said polymer material being selected from the class consisting of rubbers, plastomers and combinations thereof.

(References on following page)

References Cited

UNITED STATES PATENTS

| | | | |
|---|---|---|---|
| 2,614,089 | 10/1952 | Harrison et al. | 260—880 |
| 2,755,270 | 7/1956 | Hayes | 260—880 |
| 2,614,093 | 10/1952 | Wheelock | 260—892 |
| 2,643,987 | 6/1953 | Harrison et al. | 260—892 |
| 3,190,850 | 6/1965 | Burke | 260—877 |
| 2,600,024 | 6/1952 | Romeyn et al. | 260—893 |

FOREIGN PATENTS

| | | |
|---|---|---|
| 593,072 | 10/1947 | Great Britain. |
| 799,043 | 7/1958 | Great Britain. |

MURRAY TILLMAN, Primary Examiner

M. J. TULLY, Assistant Examiner

U.S. Cl. X.R.

260—5, 80.7, 80.72, 80.78, 86.7, 88.1, 88.2, 874, 876, 885, 886, 890, 892, 893, 897, 898, 899, 901